(12) United States Patent
Kawazoe et al.

(10) Patent No.: US 9,638,282 B2
(45) Date of Patent: May 2, 2017

(54) DAMPER APPARATUS

(71) Applicant: AISIN SEIKI KABUSHIKI KAISHA, Kariya-shi, Aichi-ken (JP)

(72) Inventors: Hiroshi Kawazoe, Kariya (JP); Masaru Ebata, Chita (JP); Takuya Fujiwara, Anjo (JP); Miki Torii, Nishio (JP); Tomohiro Saeki, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/658,435

(22) Filed: Mar. 16, 2015

(65) Prior Publication Data

US 2015/0276012 A1    Oct. 1, 2015

(30) Foreign Application Priority Data

Mar. 27, 2014 (JP) ................................. 2014-066927

(51) Int. Cl.
*F16F 15/123* (2006.01)
*F16F 15/134* (2006.01)
*F16F 15/139* (2006.01)

(52) U.S. Cl.
CPC ...... *F16F 15/13484* (2013.01); *F16F 15/139* (2013.01)

(58) Field of Classification Search
CPC .......................... F16F 15/13484; F16F 15/139
USPC ...... 464/68.2, 68.8, 67.1; 192/213.2–213.22; 188/380; 74/574.2, 574.4
See application file for complete search history.

(56) References Cited

U.S. PATENT DOCUMENTS

| 1,825,402 A * | 9/1931 | Judson .............. F16F 15/12313 |
| | | 74/574.4 X |
| 8,161,739 B2 | 4/2012 | Degler et al. |
| 8,403,762 B2 * | 3/2013 | Steinberger ....... F16F 15/13492 |
| 2015/0276013 A1 * | 10/2015 | Kawazoe ............ F16F 15/1392 |
| | | 464/68.2 |

FOREIGN PATENT DOCUMENTS

JP    2011-504986 A    2/2011

* cited by examiner

*Primary Examiner* — Gregory Binda
(74) *Attorney, Agent, or Firm* — Buchanan Ingersoll & Rooney PC

(57) ABSTRACT

A damper apparatus includes a first rotation member, a second rotation member, a first elastic portion interposed between the first and the second rotation members and elastically deformed by a relative rotation between the first and the second rotation members, a third rotation member, a second elastic portion interposed between the second and third rotation members and elastically deformed by a relative rotation between the second and third rotation members, and a dynamic vibration absorber. The dynamic vibration absorber includes an anchor member and a third elastic portion that is interposed between the anchor member and the second rotation member and that is elastically deformed by a relative rotation between the anchor member and the second rotation member. At least the third elastic portion is positioned at an inner side of the first elastic portion and the second elastic portion in a radial direction of the rotation axis.

11 Claims, 11 Drawing Sheets

F I G. 1
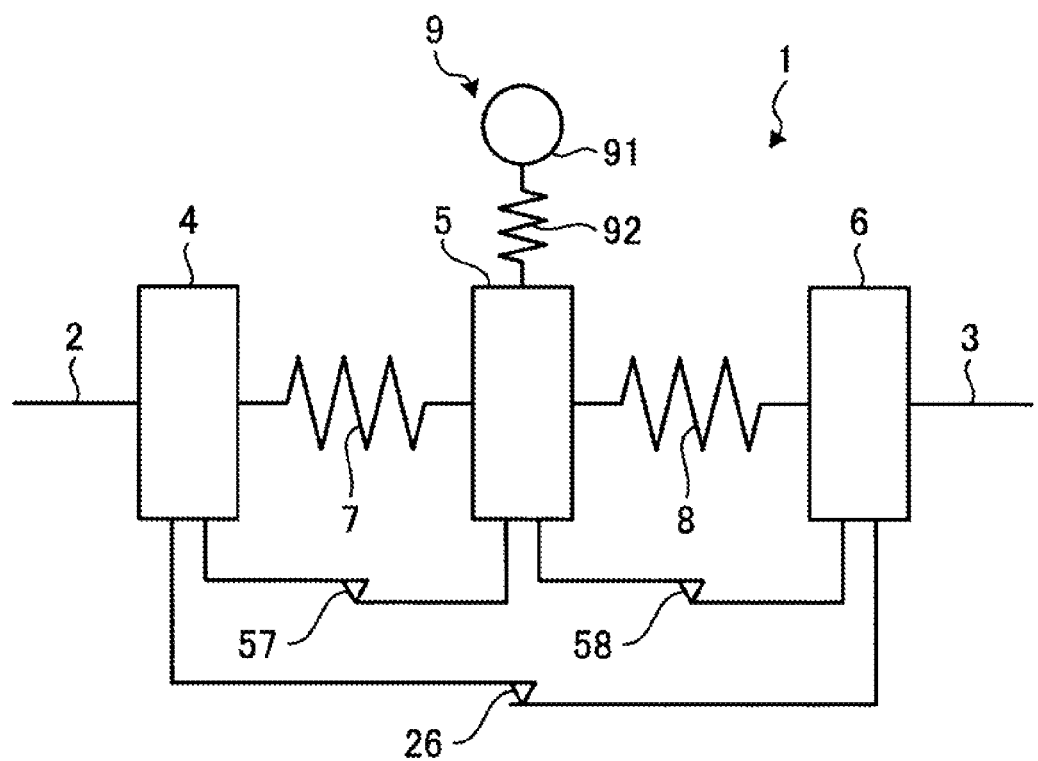

DAMPER APPARATUS

CROSS REFERENCE TO RELATED APPLICATIONS

This application is based on and claims priority under 35 U.S.C. §119 to Japanese Patent Application 2014-066927, filed on Mar. 27, 2014, the entire content of which is incorporated herein by reference.

TECHNICAL FIELD

This disclosure generally relates to a damper apparatus.

BACKGROUND DISCUSSION

A known damper apparatus, which is disclosed in JP2011-504986A, for example, includes a first elastic portion disposed between a first rotation member and a second rotation member, a second elastic portion disposed between the second rotation member and a third rotation member, and a dynamic vibration absorber mounted to the second rotation member.

According to the aforementioned damper apparatus, however, because the first elastic member and the dynamic vibration absorber are arranged to face each other in an axial direction, the damper apparatus may be enlarged in the axial direction. The damper apparatus is desirably reduced in size in the axial direction.

A need thus exists for a damper apparatus which is not susceptible to the drawback mentioned above.

SUMMARY

According to an aspect of this disclosure, a damper apparatus includes a first rotation member being rotatable around a rotation axis, a second rotation member being rotatable around the rotation axis, a first elastic portion interposed between the first rotation member and the second rotation member and being elastically deformed by a relative rotation between the first rotation member and the second rotation member, a third rotation member being rotatable around the rotation axis, a second elastic portion interposed between the second rotation member and the third rotation member and being elastically deformed by a relative rotation between the second rotation member and the third rotation member, and a dynamic vibration absorber including an anchor member and a third elastic portion that is interposed between the anchor member and the second rotation member and that is elastically deformed by a relative rotation between the anchor member and the second rotation member, at least the third elastic portion being positioned at an inner side of the first elastic portion and the second elastic portion in a radial direction of the rotation axis.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a schematic view illustrating a damper apparatus according to a first embodiment disclosed here;

DETAILED DESCRIPTION

Figure 2:
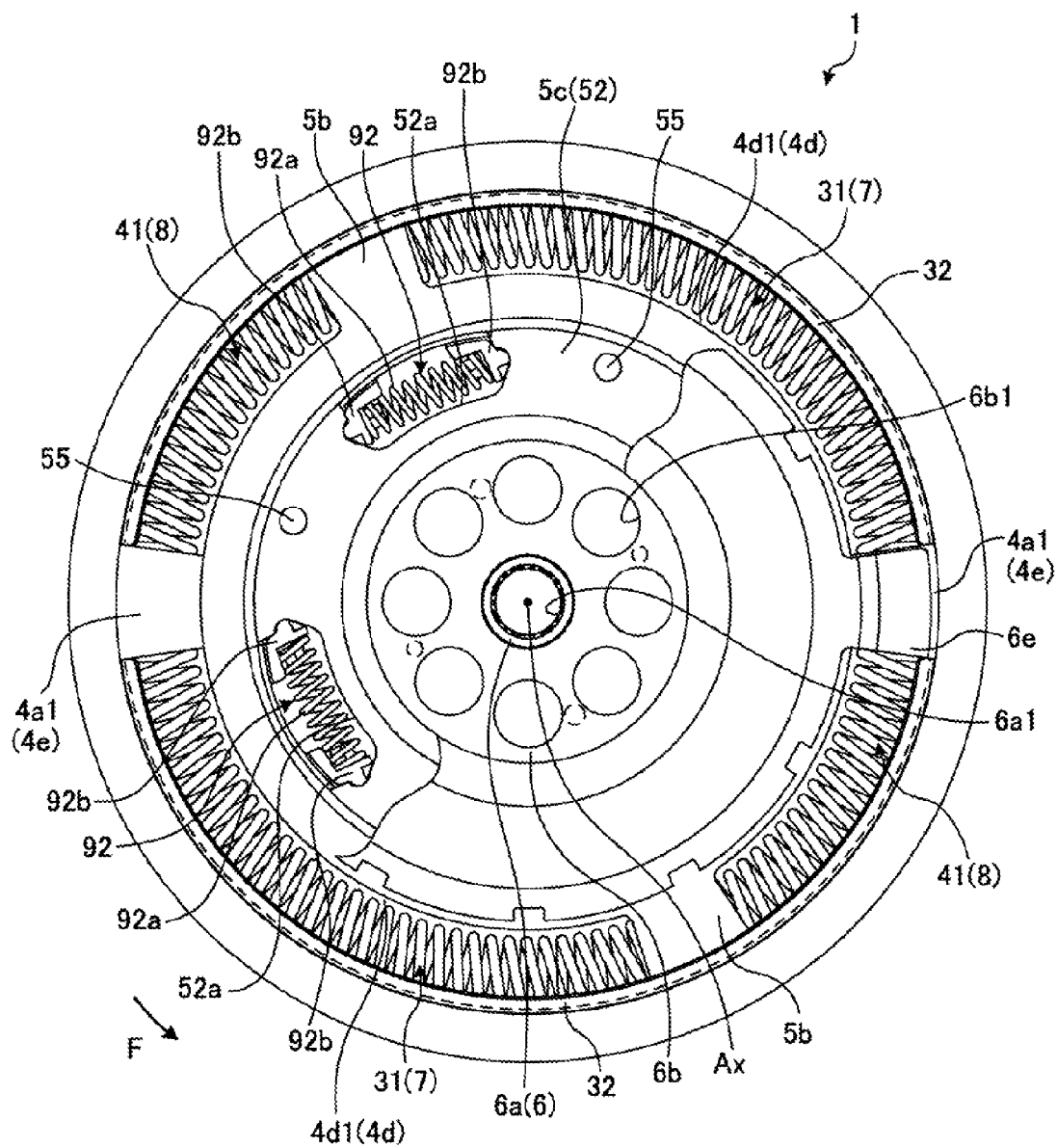
FIG. 2 is a front view of the damper apparatus according to the first embodiment when viewed from an axial direction.

Embodiments will be explained with reference to the attached drawings. The embodiments include substantially similar components to one another. Thus, the substantially similar components bear the same reference numerals and duplication of explanation will be omitted. In addition, constructions (technical features) of each embodiment explained below and effects resulting from such constructions are examples. The embodiments may be achieved by other constructions than the following disclosure and may obtain various effects (including consequential effects) from basic constructions (technical features).

A first embodiment will be explained with reference to FIGS. 1 to 3 and 12. As illustrated in FIG. 1, a damper apparatus 1 serving as a torque fluctuation absorber is disposed, for example, between a power source and a passive portion (i.e., a driven portion) at a drive train of a vehicle. Specifically, the damper apparatus 1 is disposed between an output shaft 2 (i.e., a connection target) of the power source and an input shaft 3 (i.e., a connection target) of the passive portion for transmitting a motive power between the output shaft 2 and the input shaft 3. The damper apparatus 1 is configured to absorb (i.e., damps or restrains) a torque fluctuation and a torsional vibration generated by torsion between the output shaft 2 and the input shaft 3, for example. The damper apparatus 1 constitutes a power transmission passage together with the output shaft 2 and the input shaft 3. The power source includes an engine and an electric motor, for example, and the passive portion includes a transmission and a transaxle, for example. As the power source, a hybrid system including both the engine and the motor may be also employed.

A rotation axis Ax (i.e., a rotation center, refer to FIGS. 2 and 3) of the damper apparatus 1 serves as a rotation axis of each rotation member included in the damper apparatus 1. The rotation axis Ax substantially coincides with each rotation axis of the output shaft 2 or the input shaft 3. In the following, unless otherwise specified, an axial direction, a radial direction and a circumferential direction are defined on the basis of the rotation axis Ax. Further, for convenience in the following discussion, a side where the engine is provided in the axial direction (corresponding to a left side in FIG. 1) is referred to as a first side in the axial direction while a side where the transmission is provided in the axial direction (corresponding to a right side in FIG. 1) is referred to as a second side in the axial direction. The first side in the axial direction is indicated by an arrow X and a radially outer side is indicated by an arrow R in the drawings. Furthermore, a direction in which the damper apparatus 1 rotates by a driving force of a drive source is referred to as a forward rotation direction which is indicated by an arrow F in the drawings.

The damper apparatus 1 includes three (plural) rotation members 4, 5, 6 (a mass body, a flywheel mass, and an inertia body), two (plural) elastic portions 7, 8, a dynamic vibration absorber 9 and a hysteresis portion 10, for example.

The rotation members 4 to 6 are connected in series at the power transmission passage. The rotation members 4 to 6 are rotatable about the rotation axis Ax. The rotation member 4 is connected to the output shaft 2 so as to be integrally rotatable therewith. That is, the rotation member 4 receives a rotational driving force from the outside of the damper apparatus 1. The rotation member 6 is connected to the input shaft 3 so as to be integrally rotatable therewith. The rotation member 5 is disposed between the rotation members 4 and 6 to be connected thereto via the elastic portions 7 and 8. In the embodiment, as an example, the rotation member 4 serves as a first rotation member, the rotation member 5 serves as a second rotation member, and the rotation member 6 serves as a third rotation member.

The elastic portions 7 and 8 are connected in series. The elastic portion 7 is disposed between the rotation members 4 and 5. The elastic portion 7 is elastically deformed by a relative rotation between the rotation members 4 and 5. The elastic portion 7 absorbs, by its elastic deformation, a torque fluctuation between the rotation members 4 and 5. The elastic portion 8 is disposed between the rotation members 5 and 6. The elastic portion 8 is elastically deformed by a relative rotation between the rotation members 5 and 6. The elastic portion 8 absorbs, by its elastic deformation, a torque fluctuation between the rotation members 5 and 6. In the embodiment, as an example, the elastic portion 7 serves as a first elastic portion while the elastic portion 8 serves as a second elastic portion.

The dynamic vibration absorber 9 is mounted at the rotation member 5. The dynamic vibration absorber 9 restrains a torsional vibration generated between the rotation member 4 (i.e., the input shaft 3) and the rotation member 6 (i.e., the output shaft 2).

The hysteresis portion 10 is arranged between the rotation members 4 and 6 via the rotation member 5. The hysteresis portion 10 reduces vibrations of the rotation members 4 to 6, i.e., vibrations between the output shaft 2 and the input shaft 3, by hysteresis torque based on friction.

Figure 3:
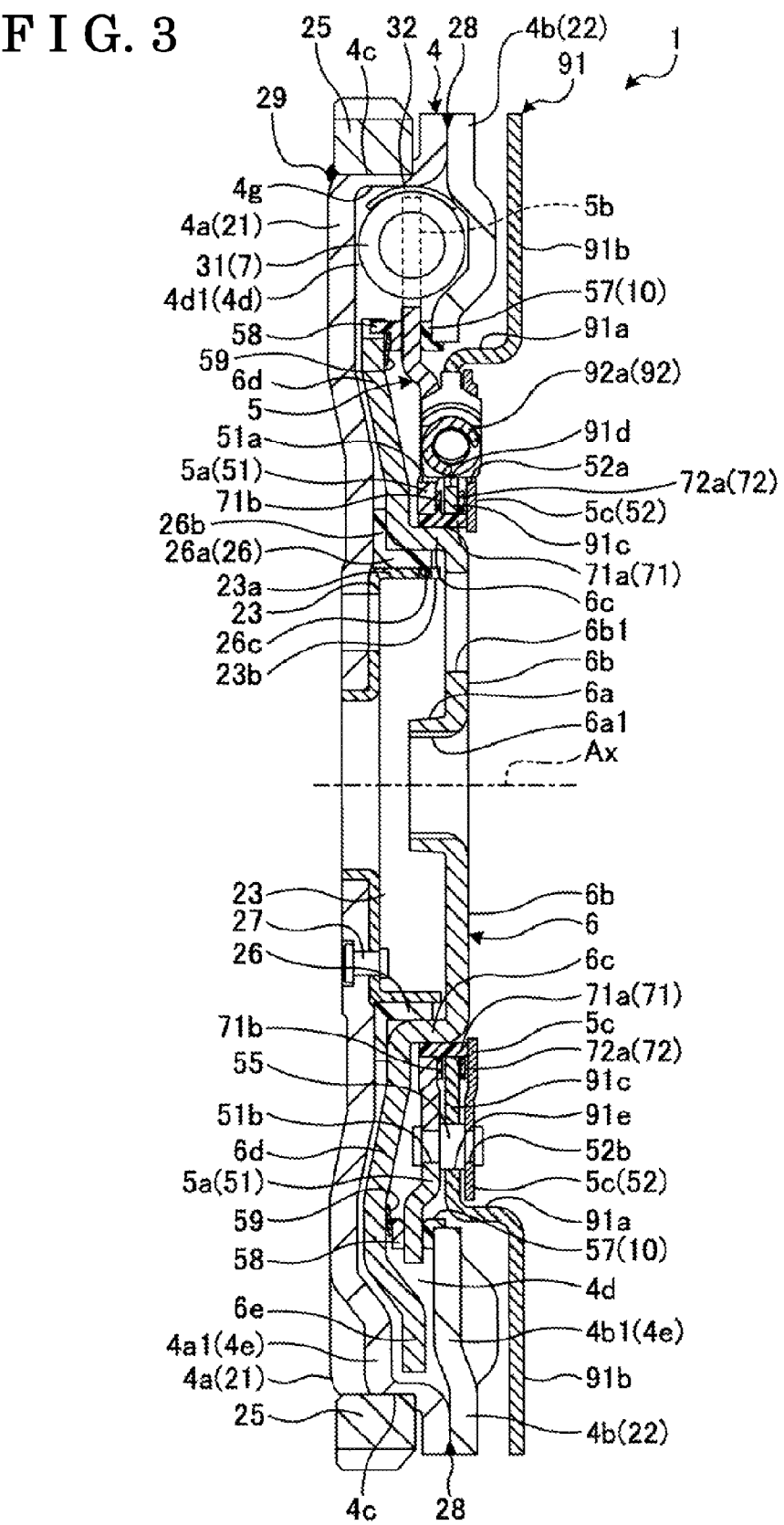
FIG. 3 is a cross-sectional view of the damper apparatus according to the first embodiment.
Figure 12:
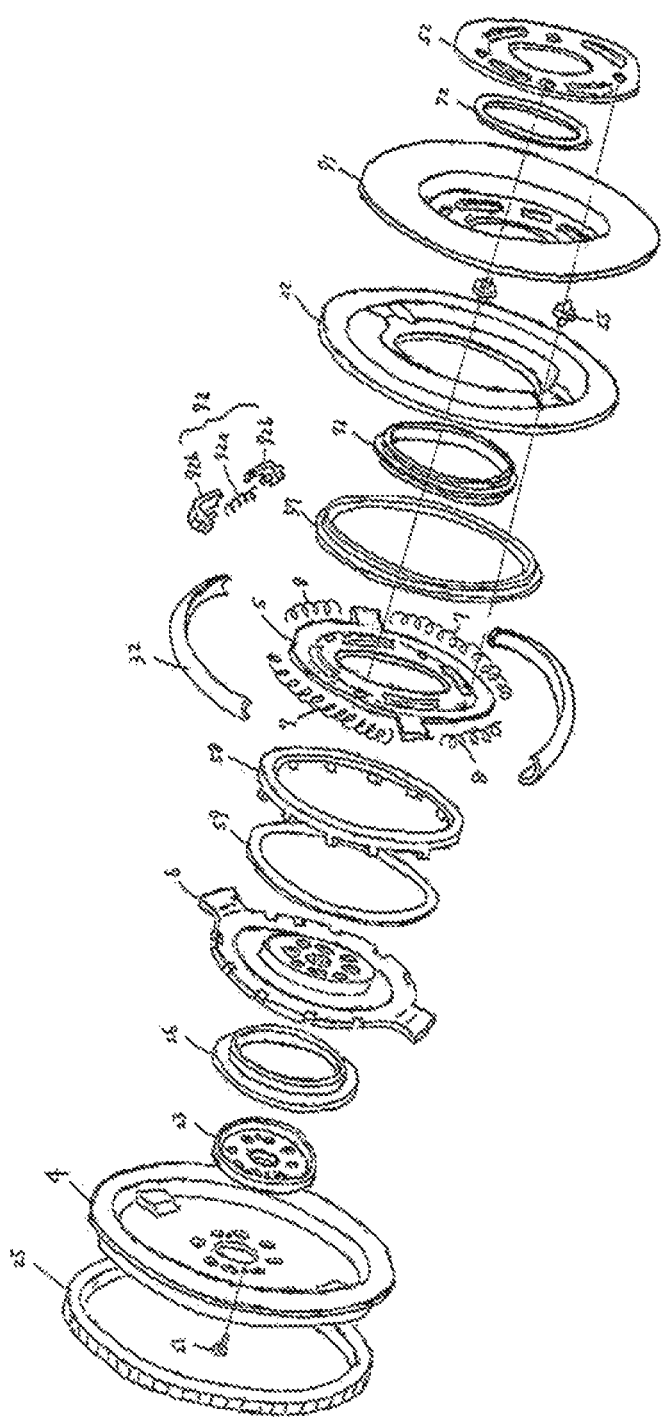
FIG. 12 is an exploded view of the damper apparatus according to the first embodiment disclosed here.

The components and members of the damper apparatus 1 will be explained in detail with reference to FIGS. 2, 3, and 12. In FIGS. 2, 3, and 12, some of the components and members are omitted for clarity.

The rotation member 4 includes a pair of wall portions 4a, 4b positioned to be spaced away from each other in the axial direction, and a connection portion 4c formed between the wall portions 4a and 4b to extend over the wall portions 4a and 4b. Each of the wall portions 4a and 4b is annularly formed around the rotation axis Ax to extend in the radial direction. The wall portion 4b is positioned at the second side (the right side in FIG. 3) of the wall portion 4a in the axial direction. The wall portion 4b covers an outer peripheral portion of the wall portion 4a. The connection portion 4c is formed in an annular form around the rotation axis Ax by extending across an outer peripheral portion (i.e., an end portion at a radially outer side) of the wall portion 4a and an outer peripheral portion of the wall portion 4b. The wall portions 4a, 4b, and the connection portion 4c may be made of metallic material, for example. In the embodiment, the wall portion 4a is connected to the output shaft 2 via a flywheel (i.e., an external rotation member) so that the rotation member 4 rotates integrally with the output shaft 2.

The rotation member 4 includes a housing chamber 4d (void) formed to be surrounded by the wall portions 4a, 4b, and the connection portion 4c. That is, the housing chamber 4d is formed between the wall portions 4a and 4b. The elastic portions 7 and 8 are housed in the housing chamber 4d. The wall portion 4a includes a support portion 4a1 (a portion) that overlaps the elastic portions 7 and 8 in the circumferential direction. The support portion 4a1 includes a protrusion surface at the second side in the axial direction. That is, the support portion 4a1 is formed to protrude towards the wall portion 4b (i.e., towards the second side in the axial direction into the housing chamber 4d). In addition, the second wall portion 4b includes a support portion 4b1 (a portion) that overlaps the elastic portions 7 and 8 in the circumferential direction. The support portion 4b1 includes a protrusion surface at the first side in the axial direction. That is, the support portion 4b1 is formed to protrude towards the wall portion 4a (i.e., towards the first side in the axial direction into the housing chamber 4d). The support portions 4a1 and 4b1 overlap (i.e., face) in the axial direction while being spaced away from each other in the axial direction. Specifically, the plural (for example, two) support portions 4a1 are formed to be spaced away from each other in the circumferential direction while the plural (for example, two) support portions 4b1 are formed to be spaced away from each other in the circumferential direction. The support portions 4a1 and 4b1 overlapping in the axial direction constitute a support portion 4e. That is, in the embodiment, the rotation member 4 includes the plural (for example, two) support portions 4e positioned to be spaced away from each other in the circumferential direction. The plural support portions 4e divides the housing chamber 4d into plural (for example, two) housing sections 4d1 facing in the circumferential direction. The elastic portions 7 and 8 are housed in each of the housing sections 4d1.

The rotation member 4 is constituted by plural members, for example. In the embodiment, the rotation member 4 includes plates 21, 22 and 23. The plate 21 includes a portion of the wall portion 4a including the support portion 4a1, and a portion of the connection portion 4c. The plate 22 includes the wall portion 4b including the support portion 4b1 and a portion of the connection portion 4c. The plate 23 includes a portion of the wall portion 4a. Outer end portions of the plates 21 and 22 overlap each other to be connected or secured by a welding 28, for example. The plate 23 is connected or secured to the plate 21 by a fastening member 27 such as a rivet, for example, in a state to overlap the plate 21 at the second side thereof in the axial direction (at the right side in FIG. 3). The plate 23 is smaller in diameter than the plate 21. The plates 21 and 23 are fastened together to the flywheel by a fastening member such as a bolt, for example. Accordingly, because the plates 21 and 23 are fastened together by the fastening member such as a bolt, for example, the number of components may be reduced as compared to a construction where the plates 21 and 23 are not fastened together. In addition, a gear 25 is provided at the rotation member 4. The gear 25 is connected or fixed to the connection portion 4c of the plate 21 by a welding 29, for example. The gear 25 is connected to an engine starter.

The rotation member 5 includes a wall portion 5a, a protruding portion 5b serving as a support portion protruding radially outwardly from the wall portion 5a, and a wall portion 5c positioned at the second side in the axial direction relative to the wall portion 5a. Each of the wall portions 5a and 5c is formed annularly around the rotation axis Ax to expand in the radial direction. An outer edge portion of the wall portion 5a is positioned within the housing chamber 4d while an inner edge portion (i.e., an end portion at a radially inner side) of the wall portion 5a is positioned out of the housing chamber 4d. Specifically, the plural (for example, two) protruding portions 5b are provided to be spaced away from each other in the circumferential direction. The protruding portions 5b are positioned within the respective housing sections 4d1 of the rotation member 4. Each of the protruding portions 5b is housed in each of the housing sections 4d1 of the rotation member 4. The rotation member 5 is connected to the rotation members 4 and 6 via the hysteresis portion 10.

The rotation member 5 is constituted by plural members, for example. In the embodiment, the rotation member 5 includes plates 51 and 52. The plate 51 includes the wall portion 5a and the protruding portions 5b while the plate 52 includes the wall portion 5c. The plate 51 includes plural opening portions 51a formed to be spaced away from one another in the circumferential direction and plural opening portions 51b formed to be spaced away from one another in the circumferential direction. In the same manner, the plate 52 includes plural opening portions 52a formed to be spaced away from one another in the circumferential direction and plural opening portions 52b formed to be spaced away from one another in the circumferential direction. The opening portions 51a and 52a are positioned to overlap one another in the axial direction while the opening portions 51b and 52b are positioned to overlap one another in the axial direction. Each of the opening portions 51a and 52a is formed by an elongated bore that extends in the circumferential direction, for example. Each of the opening portions 51b and 52b is formed by a penetration bore through which a fastening member 55 such as a rivet, for example, penetrates. The plate 52 is connected or secured to the plate 51 by the fastening member 55 in a state to overlap the plate 51 at the second side in the axial direction (at the right side in FIG. 3) relative to the plate 51.

The rotation member 6 includes a cylindrical portion 6a, a wall portion 6b protruding radially outwardly from the cylindrical portion 6a, a wall portion 6c protruding from the wall portion 6b to the first side (the left side in FIG. 3) in the axial direction, and a wall portion 6d protruding radially outwardly from the wall portion 6c. Each of the cylindrical portion 6a and the wall portions 6b, 6c, 6d is formed annularly around the rotation axis Ax. The rotation member 6 also includes a protruding portion 6e serving as a support portion protruding radially outwardly from an outer edge portion of the wall portion 6d. Specifically, the plural (for example, two) protruding portions 6e are formed to be spaced away from each other in the circumferential direction. The protruding portions 6e are positioned within the housing chamber 4d of the rotation member 4. Specifically, the protruding portions 6e are positioned between the support portion 4a1 and the support portion 4b1 in the axial direction (see FIG. 3). Each of the protruding portions 6e overlaps the support portions 4a1 and 4b1 in the axial direction in a state to be spaced away from the support portions 4a1 and 4b1. The rotation member 6 is constituted by a single plate, for example. In the embodiment, the cylindrical portion 6a is connected to the input shaft 3 so that the rotation member 6 integrally rotates with the input shaft 3.

A spline 6a1 is formed at an inner peripheral surface of the cylindrical portion 6a. The input shaft 3 is connected or secured to the spline 6a1 so that the rotation member 6 integrally rotates with the input shaft 3. A bore 6b1 is formed at the wall portion 6b to penetrate therethrough in the axial direction. The bore 6b1 allows a passage of a fastening member such as a bolt, for example, that fastens the plates 21, 23 and the flywheel. The spline 6a1 is positioned at the radially inner side relative to the bore 6b1.

A thrust member 26 is disposed between the rotation member 6 and the rotation member 4. Specifically, the thrust member 26 is arranged between the wall portion 6d and the wall portion 4a. The thrust member 26 is positioned at the radially inner side relative to the elastic portions 7 and 8. The thrust member 26 is provided at a stepped portion formed or obtained by the plates 21 and 23. Specifically, the thrust member 26 includes a cylindrical portion 26a, a wall portion 26b, and a hook portion 26c. The cylindrical portion 26a is formed in a cylindrical form with reference to the rotation axis Ax and is sandwiched and held between a cylindrical portion 23a of the plate 23 and the wall portion 6c from opposed sides in the radial direction. The wall portion 26b is formed in an annular plate form expanding or protruding radially outwardly (i.e., in a direction of the arrow R) from an end portion of the cylindrical portion 26a at the first side (the left side in FIG. 3) in the axial direction. The wall portion 26b is sandwiched and held between the plate 21 and the wall portion 6d from the opposed sides in the axial direction. The hook portion 26c protrudes radially inwardly from an end portion of the cylindrical portion 26a at the second side (the right side in FIG. 3) in the axial direction. The hook portion 26c is positioned within (i.e., engaged with or fitted into) a recess portion 23b (i.e., a cut portion) formed at the cylindrical portion 23a. Accordingly, the thrust member 26 and the rotation member 4 are united in the circumferential direction. The thrust member 26 that integrally rotates with the rotation member 4 is slidable relative to the rotation member 6 in the circumferential direction. Because the thrust member 26 and the rotation member 6 slide (rotate) relative to each other, a sliding resistance (frictional resistance) is generated between the thrust member 26 and the rotation member 6. That is, the thrust member 26 generates the sliding resistance (frictional resistance) in a case where the rotation members 4 and 6 rotate relative to each other. In this case, the thrust member 26 may slide or rotate in the circumferential direction relative to the rotation member 4 or to both the rotation members 4 and 6. The thrust member 26 is also disposed between the rotation members 4 and 6 in the radial direction so as to function as a slide bearing for allowing the relative rotation between the rotation members 4 and 6. In the embodiment, the rotation member 6 is supported and positioned in the axial direction and the radial direction (i.e., centered) by means of the thrust member 26. The thrust member 26 serves as an example of a first intervening member.

The elastic portion 7 includes an elastic member 31 disposed between the rotation members 4 and 5. Torque (rotation) is transmitted between the rotation members 4 and 5 via the elastic member 31. The rotation member 5 is rotatable relative to the rotation member 4 within a range in which the elastic member 31 is allowed to expand and contract (i.e., within a predetermined angle range). In the embodiment, the plural (for example, two) elastic members 31 (the elastic portions 7) are arranged to be spaced away from each other in the circumferential direction.

The elastic members 31 function as compression springs that compress (i.e., elastically deform or expand and compress) along a tangential direction relative to the circumferential direction, for example. The elastic members 31 are formed by coil springs, for example. Specifically, each of the elastic members 31 is formed by a coil spring in a straight form which is curved along the circumferential direction for assembly or a coil spring of which a winding axis is curved along the circumferential direction (i.e., a so-called arc-shaped spring or arc spring). The winding axis of the elastic member 31 (coil spring) extends substantially along the tangential direction relative to the circumferential direction. In the embodiment, the elastic members 31 are housed in the housing chamber 4d, specifically, in the respective housing sections 4d1. The elastic member 31 housed in each of the housing sections 4d1 is disposed between the support portion 4e and the protruding portion 5b which is positioned at a front side of the aforementioned support portion 4e in the forward rotation direction (i.e., in the counterclockwise direction in FIG. 2 corresponding to the direction F). The elastic member 31 arranged within each of the housing sections 4d1 is supported by a support member 32 serving as a support portion, a holding portion, a holding member, a seat, or a retainer, for example. The support member 32 is arranged between the elastic member 31 and a bottom portion 4g of the housing section 4d1. The support member 32 includes a function, for example, to stably support the elastic member 31, to cause the elastic member 31 to stably elastically deform (expand and contract), and to restrain a direct contact between the elastic member 31 and the rotation member 4. The support member 32 is made of synthetic resin material, for example. Because the support member 32 is disposed between the elastic member 31 and the bottom portion 4g of each of the housing sections 4d1, abrasion of the elastic member 31 may be restrained.

Each of the elastic members 31 is sandwiched and held between the support portion 4e and the protruding portion 5b as mentioned above. The elastic members 31 expand and contract in response to a difference between an input torque at the rotation member 4 and a load torque at the rotation member 5. Specifically, in the embodiment, in a case where a torque fluctuation (fluctuation in torque difference) is generated between the rotation member 4 and the rotation member 5, the elastic members 31 elastically contract to tentatively store an elastic energy converted from a rotation energy which is obtained in response to the torque fluctuation. The elastic energy that is tentatively stored at the elastic members 31 is converted to a rotation energy (torque) when the elastic members 31 expand elastically.

The elastic portion 8 includes an elastic member 41 disposed between the rotation members 5 and 6. Torque (rotation) is transmitted between the rotation members 5 and 6 via the elastic member 41. The rotation member 6 is rotatable relative to the rotation member 5 (and the rotation member 4) within a range in which the elastic member 41 is allowed to expand and contract (i.e., within a predetermined angle range). In the embodiment, the plural (for example, two) elastic members 41 (the elastic portions 8) are arranged to be spaced away from each other in the circumferential direction. In addition, the elastic portions 7 and 8 are disposed in line along the circumferential direction. Further, the elastic portions 7 and 8 are alternately positioned in the circumferential direction.

In the embodiment, the elastic members 41 function as compression springs that compress (i.e., elastically deform or expand and compress) along the tangential direction relative to the circumferential direction, for example. The elastic members 41 are formed by coil springs, for example. Specifically, in the same way as the elastic members 31, each of the elastic members 41 is formed by a coil spring in a straight form which is curved along the circumferential direction for assembly or a coil spring of which a winding axis is curved along the circumferential direction (i.e., a so-called arc-shaped spring or arc spring). The winding axis of the elastic member 41 (coil spring) extends substantially along the tangential direction relative to the circumferential direction. In the embodiment, the elastic members 41 are housed in the housing chamber 4d, specifically, in the respective housing sections 4d1. The elastic member 41 housed in each of the housing sections 4d1 is disposed between the protruding portion 5b and the protruding portion 6e which is positioned at a front side of the aforementioned protruding portion 5b in the forward rotation direction (i.e., in the counterclockwise direction in FIG. 2 corresponding to the direction F). That is, the elastic member 41 positioned within each of the housing sections 4d1 is disposed between the protruding portion 5b and the protruding portion 6e both of which are arranged within the aforementioned housing section 4d1. The elastic member 41 arranged within each of the housing sections 4d1 is supported, together with the elastic member 31, by the support member 32 that is provided at the bottom portion 4g of the housing section 4d1. Accordingly, the support member 32 includes a function, for example, to stably support the elastic member 41, to cause the elastic member 41 to stably elastically deform (expand and contract), and to restrain a direct contact between the elastic member 41 and the rotation member 4. Because the support member 32 is disposed between the elastic member 41 and the bottom portion 4g of the housing section 4d1, abrasion of the elastic member 41 may be restrained. Each of the elastic members 31 and 41 may be formed by a flat spring including a flat external form. The elastic portion 7 may be configured to include the single elastic member 31 and the elastic portion 8 may be configured to include the single elastic member 41.

As mentioned above, each of the elastic members 41 is sandwiched and disposed between the protruding portion 5b and the protruding portion 6e. The elastic members 41 expand and contract in response to a difference between an input torque at the rotation member 5 and a load torque at the rotation member 6. Specifically, in the embodiment, in a case where a torque fluctuation (fluctuation in torque difference) is generated between the rotation member 5 and the rotation member 6, the elastic members 41 elastically contract to tentatively store an elastic energy converted from a rotation energy which is obtained in response to the torque fluctuation. The elastic energy that is tentatively stored at the elastic members 41 is converted to a rotation energy (torque) when the elastic members 41 expand elastically.

The hysteresis portion 10 includes a pair of thrust members 57 and 58 between which the wall portion 5a of the rotation member 5 is sandwiched, and an elastic member 59 that biases the thrust member 58.

Each of the thrust members 57 and 58 is annularly formed around the rotation axis Ax. The thrust members 57 and 58 are positioned at the radially inner side relative to the elastic members 31 and 41 (the elastic portions 7 and 8). The thrust member 57 is disposed between the rotation members 4 and 5 and is connected or secured to the wall portion 4b of the rotation member 4 to integrally rotate therewith. That is, the thrust member 57 is provided to be rotatable about the rotation axis Ax. The thrust member 58 is disposed between the rotation members 5 and 6. The thrust member 58 is connected or secured to the wall portion 6d of the rotation member 6 to integrally rotate therewith. That is, the thrust member 58 is provided to be rotatable about the rotation axis Ax. In addition, the thrust member 58 is connected to the wall portion 6d to be axially movable. The elastic member 59 is formed by a disc spring, for example. The elastic member 59 which is formed by a disc spring, for example, is disposed between the wall portion 6d of the rotation member 6 and the thrust member 58. The elastic member 59 is supported at the wall portion 6d to integrally rotate with the rotation member 6. The elastic member 59 biases the thrust member 58 towards the wall portion 5a (towards the thrust member 57) by an elastic force. Because of the elastic force of the elastic member 59, the thrust members 57 and 58 are in press-contact with the rotation member 5. At this time, the thrust members 57 and 58 are rotatable relative to the rotation member 5 in the circumferential direction. The hysteresis portion 10 reduces vibrations of the rotation members 4 to 6 by a sliding torque (i.e., a friction torque or a hysteresis torque) based on a sliding resistance generated between the rotation member 5 and the thrust members 57 and 58. The elastic member 59 also presses the wall portion 6d of the rotation member 6 against the thrust member 26. That is, the elastic member 59 functions as a disc spring for applying a sliding resistance (a friction resistance) between the wall portion 6d of the rotation member 6 and the thrust member 26 (the rotation member 4).

The dynamic vibration absorber 9 includes an anchor member (spindle member or weight member) 91 and an elastic portion 92 serving as a third elastic portion as illustrated in FIGS. 1 and 3.

The anchor member 91 includes a cylindrical portion 91a, a wall portion 91b and a wall portion 91c. The cylindrical portion 91a is formed in a cylindrical form with reference to the rotation axis Ax and is positioned at the radially outer side relative to the wall portion 5c. The wall portion 91b expands and protrudes radially outwardly from the cylindrical portion 91a to be formed in an annular and plate form intersecting with (for example, in orthogonal to) the rotation axis Ax. The wall portion 91b is formed at an end portion of the cylindrical portion 91a at the second side (the right side in FIG. 3) in the axial direction in a state to overlap the wall portion 4b at the second side of the wall portion 4b in the axial direction. The wall portion 91c expands and protrudes radially inwardly from the cylindrical portion 91a to be formed in an annular and plate form intersecting with (for example, in orthogonal to) the rotation axis Ax. The wall portion 91c is formed at an end portion of the cylindrical portion 91a at the first side (the left side in FIG. 3) in the axial direction so as to be positioned between the wall portions 5a and 5c. The wall portion 91c includes plural opening portions 91d and plural opening portions 91e formed to be spaced away from one another in the circumferential direction. Each of the opening portions 91d and 91e is formed by an elongated bore that extends in the circumferential direction, for example. Each of the opening portions 91d overlaps the opening portion 51a and the opening portion 52a of the rotation member 5 in the axial direction. Each of the opening portions 91e overlaps the opening portion 51b and the opening portion 52b of the rotation member 5 in the axial direction. In the embodiment, the anchor member 91 is formed by the single plate. The anchor member 91 may function as an inertia body (mass body).

The elastic portion 92 includes an elastic member 92a disposed between the anchor member 91 and the rotation member 5. The elastic member 92a is housed in the opening portions 51a, 52a, and 91d which overlap one another in the axial direction. Torque (rotation) is transmitted between the rotation member 5 and the anchor member 91 via the elastic member 92a. The anchor member 91 is rotatable relative to the rotation member 5 within a range in which the elastic member 92a is allowed to expand and contract (i.e., within a predetermined angle range). In the embodiment, the plural (for example, four) elastic members 92a (the elastic portions 92) are provided to be spaced away from one another in the circumferential direction.

The elastic members 92a function as compression springs that compress (i.e., elastically deform or expand and compress) along the tangential direction relative to the circumferential direction, for example. The elastic members 92a are formed by coil springs, for example. Specifically, each of the elastic members 92a is formed by a coil spring in a straight form of which a winding axis is linear. The winding axis of the elastic member 92a (coil spring) extends substantially along the tangential direction relative to the circumferential direction. The elastic member 92a is sandwiched in the circumferential direction by a pair of support members 92b (support portions, holding portions, holding members, seats or retainers) to be supported by the support members 92b. The support members 92b include a function, for example, to stably support the elastic member 92a, to cause the elastic member 92a to stably elastically deform (expand and contract), and to restrain a direct contact between the elastic member 92a and the rotation member 5 and/or the anchor member 91. The pair of support members 92b is supported at opposed edge portions of each of the opening portions 51a, 52a, and 91d. The support members 92b are made of synthetic resin material, for example. In the embodiment, as an example, the elastic members 92a and the support members 92b constituting the elastic portions 92 are positioned at the radially inner side (i.e., a side towards the rotation axis Ax) relative to the elastic portions 7 and 8. Thus, as compared to a construction where the elastic portions 92 are arranged to face the elastic portions 7 and 8 in the axial direction (in the direction X), for example, the damper apparatus 1 may be reduced in size in the axial direction. In addition, because the support members 92b are positioned at the side closer to the rotation axis Ax, a sliding torque (a friction torque or a hysteresis torque) generated by the sliding between the support members 92b and the rotation member 5 and between the support members 92b and the anchor member 91 may be reduced as compared to a case where the support members 92b are positioned at the radially outer side relative to the elastic portions 7 and 8. Thus, for example, the function of the dynamic vibration absorber 9 may not be impeded or abrasion caused by the siding between the support members 92b and the rotation member 5 and between the support members 92b and the anchor member 91 may be restrained.

As mentioned above, the elastic member 92a and the pair of support members 92b are sandwiched and held between the opposed edge portions of the opening portions 51a and 52a in the circumferential direction and between the opposed edge portions of the opening portion 91d in the circumferential direction. Then, in a case where the rotation member 5 and the anchor member 91 rotate relative to each other so that the respective edge portions of the opening portions 51a and 52a at one side in the circumferential direction come closer to the edge portion of the opening portion 91d at the other side in the circumferential direction, the elastic member 92a elastically contracts by means of the aforementioned edge portions. On the contrary, in a case where the rotation member 5 and the anchor member 91 rotate relative to each other in a state where the elastic member 92a is elastically compressed within the opening portions 51a, 52a, and 91d so that the respective edge portions of the opening portions 51a and 52a at one side in the circumferential direction separate from the edge portion of the opening portion 91d at the other side in the circumferential direction, the elastic member 92a elastically expands. Accordingly, in the embodiment, the anchor member 91 is connected to the rotation member 5 via the elastic members 92a (the elastic portions 92) to thereby constitute the dynamic vibration absorber 9 (dynamic damper). The dynamic vibration absorber 9 may absorb a torsional vibration generated between the rotation member 4 (the input shaft 3) and the rotation member 6 (the output shaft 2) by expansion and contraction of the elastic members 92a.

In the embodiment, the fastening member 55 such as a rivet, for example, for binding or connecting the wall portions 5a and 5c is inserted to be positioned within each of the opening portions 91e (elongated bore) so as to be movable (slidable) in the circumferential direction. The anchor member 91 integrally rotates with the rotation member 5 in a state where the fastening member 55 engages with an edge portion of the opening portion 91e by the relative rotation (relative movement) between the anchor member 91 and the rotation member 5. That is, a relative rotation angle (a rotation amount) between the anchor member 91 and the rotation member 5 is specified by the edge portion of the opening portion 91e and the fastening member 55. Thus, a compression amount of the elastic member 92a may be restricted, for example, according to the embodiment. In consequence, the compression amount of each of the elastic members 92a is restrained from exceeding a predetermined value (allowable value) to thereby inhibit a decrease of durability of the elastic member 92a.

In addition, in the embodiment, grease is filled in the housing chamber 4d. At least outer edge portions of the members housed in the housing chamber 4d, i.e., the elastic members 31, 41, the support member 32, and the like, are immersed in grease. Accordingly, the members housed in the housing chamber 4d, i.e., the elastic members 31, 41, the support member 32, and the like are restrained from directly contacting the wall portions 4a, 4b, and the connection portion 4c which define the housing chamber 4d. The abrasion of the elastic members 31, 41, the support member 32, and the like housed in the housing chamber 4d, the wall portions 4a, 4b and the connection portion 4c may be restrained. In addition, grease may remain by its viscosity within the housing chamber 4d. Accordingly, leakage of grease to the outside of the housing chamber 4d is restrained. Further, an opening portion (a portion between the wall portions 4a and 4b) of the housing chamber 4d at the inner peripheral side is closed or sealed by the thrust members 26, 57, and 58. Thus, even in a case where a large impact is applied to the damper apparatus 1, for example, leakage of grease to the outside of the housing chamber 4d may be restrained.

In the embodiment, intervening members 71 and 72 are provided and interposed among the rotation members 5, 6 and the anchor member 91. The intervening member 71 includes a cylindrical portion 71a and a wall portion 71b. The cylindrical portion 71a is formed in a cylindrical form with reference to the rotation axis Ax and in contact with the wall portions 5c and 6c. The wall portion 71b is formed in an annular plate form expanding and protruding radially outwardly from the cylindrical portion 71a. The wall portion 71b is in contact with the wall portion 5a in a state to be disposed between the wall portions 5a and 91c. A clearance is formed between the wall portion 71b and the wall portion 91c. The intervening member 72 includes a wall portion 72a in an annular form positioned between the wall portions 5c and 91c. A clearance is formed between the wall portion 72a and the wall portion 91c while a clearance is formed between the wall portion 72a and the wall portion 5c. In the embodiment, positions of the wall portions 5a and 5c (the rotation member 5) in the axial direction are specified or determined by the intervening member 71. In addition, the rotation member 5 and the anchor member 91 are supported and positioned in the radial direction (i.e., centered) by the intervening member 71. That is, the intervening member 71 restrains the wall portions 5a and 5c from moving (falling) closer to each other in the axial direction and restrains the rotation member 5 and the anchor member 91 from moving (vibrating) in the radial direction. Further, because of the intervening members 71 and 72, the anchor member 91 is restrained from moving or falling in the axial direction. The intervening members 71 and 72 are made of synthetic resin material, for example. The intervening member 71 is an example of a second intervening member.

As mentioned above, in the embodiment, the elastic portions 92 (third elastic portion) of the dynamic vibration absorber 9 are positioned at the radially inner side relative to the elastic portions 7 and 8 (i.e., at the inner side of the elastic portions 7 and 8 in the radial direction), for example. Thus, as compared to a construction where the elastic portions 92 are arranged to face the elastic portions 7 and 8 in the axial direction (in the direction X), for example, the damper apparatus 1 may be reduced in size in the axial direction. In addition, because the support members 92b are positioned closer to the rotation axis Ax, a sliding torque based on the sliding between the support members 92b and the rotation member 5 and between the support members 92b and the anchor member 91 may be reduced as compared to a case where the support members 92b are arranged at the radially outer side of the elastic portions 7 and 8. Consequently, for example, the function of the dynamic vibration absorber 9 may not be easily impeded and abrasion resulting from the sliding between the support members 92b and the rotation member 5 and between the support members 92b and the anchor member 91 may be restrained.

In addition, the thrust member 26 (first intervening member) is disposed between the rotation members 4 and 6 to support the rotation member 6 in the radial direction while the intervening member 71 (second intervening member) is disposed among the rotation members 6, 5, and the anchor member 91 to support the rotation member 5 and the anchor member 91 in the radial direction. Thus, the rotation members 5, 6, and the anchor member 91, for example, are restrained from moving in the radial direction. A space in the radial direction relative to the elastic members 92a may be secured, which leads to the elastic members 92a formed by coil springs that are enlarged in the radial direction. Accordingly, the performance of the dynamic vibration absorber 9 (i.e., restraining a torsional vibration) may be enhanced.

In the embodiment, the housing chamber 4d is provided at the rotation member 4 (first rotation member). Alternatively, the housing chamber 4d may be provided at the rotation member 6 (third rotation member). In this case, the configuration of the rotation member 4 and the configuration of the rotation member 6 may be exchanged with each other.

In other words, the rotation member 6 may be connected to the output shaft 2 while the rotation member 4 may be connected to the output shaft 3. In this case, the rotation member 6 corresponds to the first rotation member while the rotation member 4 corresponds to the third rotation member.

Further, in the embodiment, the elastic member 59 of the hysteresis portion 10 is provided between the thrust member 58 and the rotation member 6. Alternatively, the elastic member 59 may be disposed between the thrust member 57 and the rotation member 4, between the thrust member 57 and the rotation member 5, or between the thrust member 58 and the rotation member 5. That is, the elastic member 59 may be desirably configured to press either the rotation member 4 or the rotation member 5 and the thrust member 57 against each other, and either the rotation member 5 or the rotation member 6 and the thrust member 58 against each other. In addition, the thrust member 57 may be configured to rotate relative to one of the rotation member 4 and the rotation member 5 to generate a sliding resistance (friction resistance) with the other of the rotation member 4 and the rotation member 5. Further, the thrust member 58 may rotate relative to one of the rotation member 5 and the rotation member 6 to generate a sliding resistance (friction resistance) with the other of the rotation member 5 and the rotation member 6.

Figure 4:
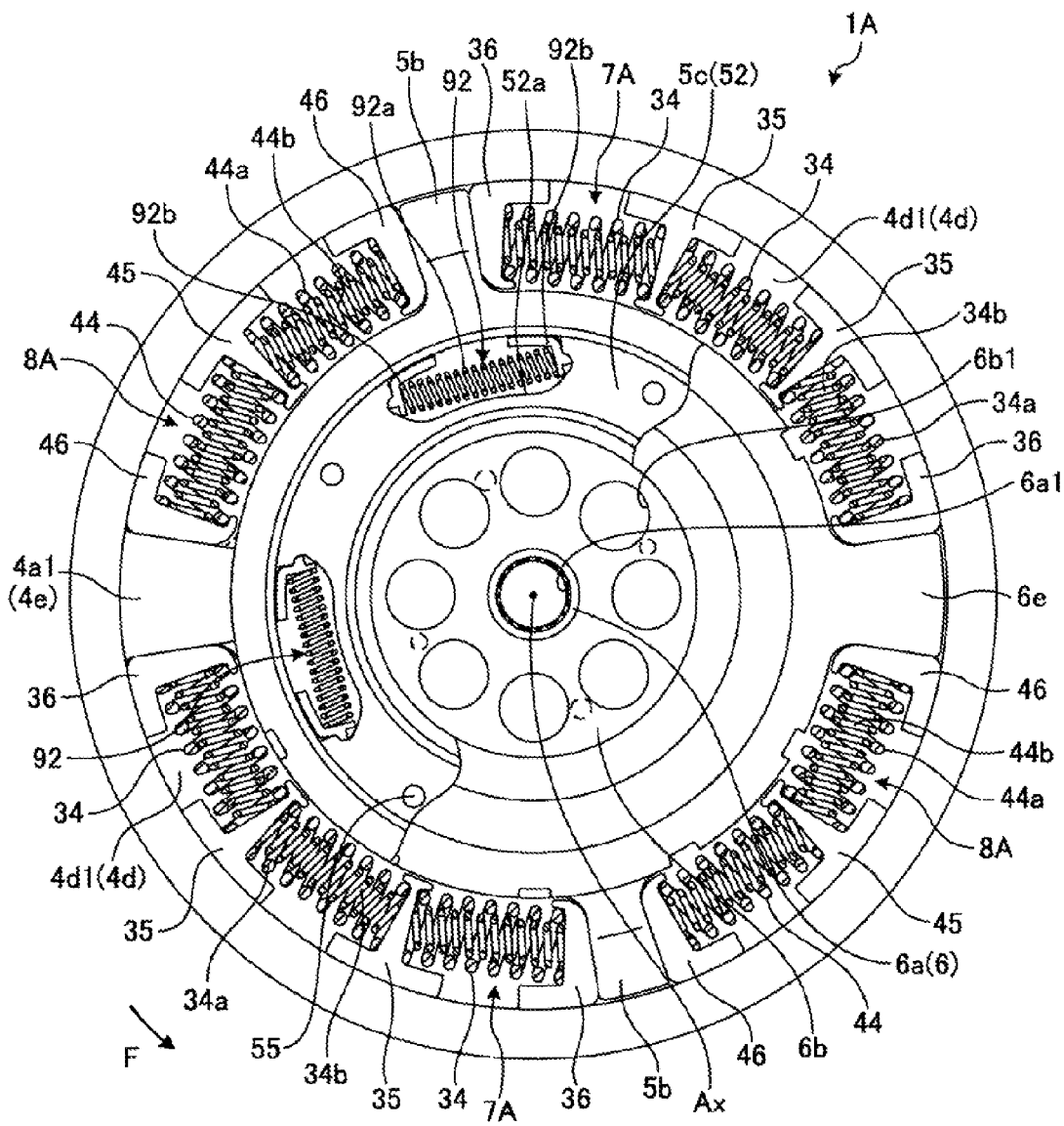
FIG. 4 is a front view (including a partially cross-sectional view) of a damper apparatus according to a second embodiment disclosed here.

A damper apparatus 1A illustrated in FIG. 4 according to a second embodiment includes a substantially similar construction to the construction of the damper apparatus 1 according to the first embodiment. Thus, the substantially similar effect as the first embodiment based on the substantially similar construction may be obtained in the second embodiment. In the following, a different construction of the second embodiment from the first embodiment will be mainly explained.

As illustrated in FIG. 4, the damper apparatus 1A includes an elastic portion 7A that includes plural elastic members 34 disposed between the rotation members 4 and 5. The plural elastic members 34 are connected in series in the circumferential direction. Each of the elastic members 34 is formed by a coil spring in a straight form of which a winding axis is linear, for example. The winding axis of the elastic member 34 extends substantially along the tangential direction relative to the circumferential direction. In addition, the elastic member 34 is a spring of a double structure including two coil portions 34a and 34b. The coil portion 34b is positioned at an inner side of the coil portion 34a. The elastic members 34 are housed in the housing chamber 4d, specifically, the plural (for example, three) elastic members 34 are housed in each of the housing sections 4d1. The three elastic members 34, for example, housed in each of the housing sections 4d1 are disposed between the support portion 4e and the protruding portion 5b which is positioned at a front side of the aforementioned support portion 4e in the forward rotation direction. The three elastic members 34 within the housing section 4d1 are connected in series in the circumferential direction via support members 35 serving as support portions, holding portions, holding members, seats, or retainers, for example. In addition, the three elastic members 34 connected in series within the housing section 4d1 are sandwiched between a pair of support members 36 in the circumferential direction to be supported thereby. Each of the support members 35 and 36 includes a function, for example, to stably support the elastic members 34, to cause the elastic members 34 to stably elastically deform (expand and contract), and to restrain a direct contact between each of the elastic members 34 and the rotation members 4, 5. The support members 35 and 36 are supported at the rotation member 4 to be movable in the circumferential direction within the housing chamber 4d. The support members 35 and 36 are made of synthetic resin material, for example. The support members 35 and 36 may be made of synthetic resin material, for example. The elastic members 34 and the support members 35, 36 are sandwiched and held between the support portion 4e and the protruding portion 5b.

In the second embodiment, an elastic portion 8A includes plural elastic members 44 disposed between the rotation members 5 and 6. The plural elastic members 44 are connected in series in the circumferential direction. The elastic portions 7A and 8A are arranged in line along the circumferential direction. The elastic portions 7A and 8A are alternately positioned in the circumferential direction. Each of the elastic members 44 is formed by a coil spring in a straight form in the same way as the elastic member 34. The elastic member 44 is a spring of a double structure including two coil portions 44a and 44b. In the second embodiment, the elastic members 44 are housed in the housing chamber 4d, specifically, the plural (for example, two) elastic members 44 are housed in each of the housing sections 4d1. The two elastic members 44, for example, housed in each of the housing sections 4d1 are disposed between the protruding portion 5b and the protruding portion 6e which is positioned at a front side of the aforementioned protruding portion 5b in the forward rotation direction. The two elastic members 44 within the housing section 4d1 are connected in series in the circumferential direction via a support member 45. The plural elastic members 44 connected in series within the housing section 4d1 are sandwiched between a pair of support members 46 serving as support portions, holding portions, holding members, seats, or retainers, for example, and supported thereby. In the second embodiment, configurations of the elastic members 44 and the support members 45, 46 are substantially similar to configurations of the elastic members 34 and the support members 35, 36 respectively.

As mentioned above, at least one of (in the embodiment, both of) the elastic portion 7A and the elastic portion 8A includes the plural elastic members 34 or 44 connected in series in the circumferential direction with reference to the rotation axis Ax. Thus, the straight-formed coil spring of which winding axis is linear may be employed as each of the elastic members 34 and 44, for example. As compared to a case where the straight-formed coil spring is curved or the winding axis of the coil is curved so as to be employed as each of the elastic members 34 and 44, the damper apparatus 1A including a simple construction may be obtained.

In the second embodiment, a spring constant of the elastic portion 7A is obtained by a combined spring constant of the plural (i.e., three in the embodiment) elastic members 34 connected in series. In addition, a spring constant of the elastic portion 8A is obtained by a combined spring constant of the plural (i.e., three in the embodiment) elastic members 44 connected in series.

Figure 5:
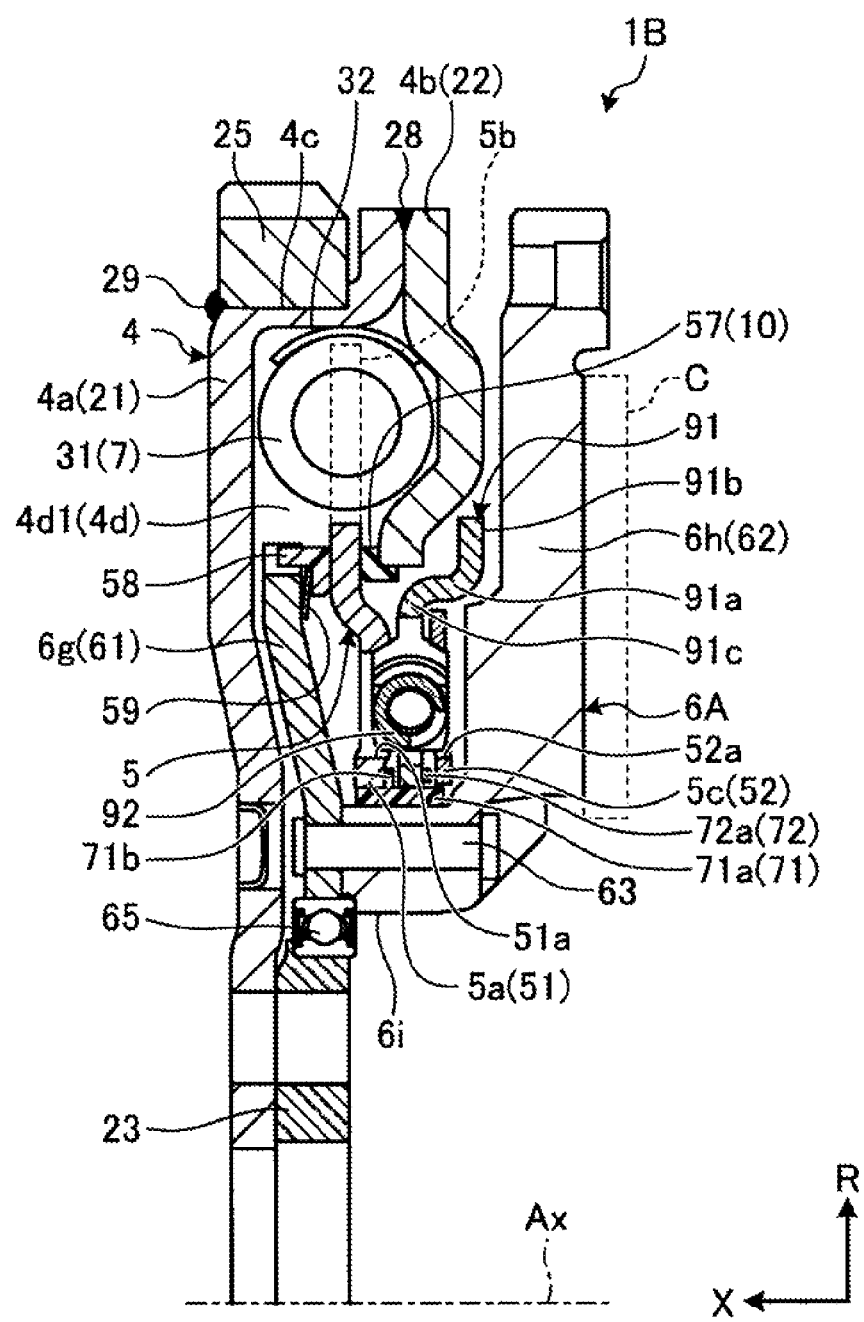
FIG. 5 is a cross-sectional view of a main portion of a damper apparatus according to a third embodiment disclosed here.

A damper apparatus 1B illustrated in FIG. 5 according to a third embodiment includes a substantially similar construction to the construction of the damper apparatus 1 according to the first embodiment. Thus, the substantially similar effect as the first embodiment based on the substantially similar construction may be obtained in the third embodiment. In the following, a different construction of the third embodiment from the first embodiment will be mainly explained.

As illustrated in FIG. 5, the damper apparatus 1B includes a rotation member 6A that includes a pair of wall portions 6g and 6h positioned to be spaced away from each other in the axial direction, and a connection portion 6i formed between the wall portions 6g and 6h to extend over the wall portions 6g and 6h. Each of the wall portions 6g and 6h is annularly formed around the rotation axis Ax to extend in the radial direction. The wall portion 6h is positioned at the second side (the right side in FIG. 5) in the axial direction relative to the wall portion 6g. The connection portion 6i is formed in an annular form around the rotation axis Ax by extending between and across an inner edge portion (i.e., an end portion at a radially inner side) of the wall portion 6g and an inner edge portion of the wall portion 6h. The wall portions 6g, 6h and the connection portion 6i may be made of metallic material, for example. The rotation member 6A includes plates 61 and 62, for example. The plate 61 includes a portion of the wall portion 6g and a portion of the connection portion 6i. The plate 62 includes the wall portion 6h and a portion of the connection portion 6i. The plate 62 is fastened or united to the plate 61 by a fastening member 63 such as a rivet, for example, in a state to overlap the plate 61 at the second side (the right side in FIG. 5) in the axial direction. The plate 61 (the rotation member 6A) is rotatably supported at the plate 23 (the rotation member 4) via a bearing 65.

In the third embodiment, the rotation member 6A includes the wall portions 6g and 6h which are disposed to face in the axial direction in a state to be away from the rotation axis Ax. Thus, a moment of inertia of the rotation member 6A may increase. The wall portion 6h may function as a flywheel that engages with a clutch disc C (see FIG. 5), for example. In this case, the damper apparatus 1B and the clutch disc C constitute a flywheel damper that may be connected to a manual transmission.

Figure 6:
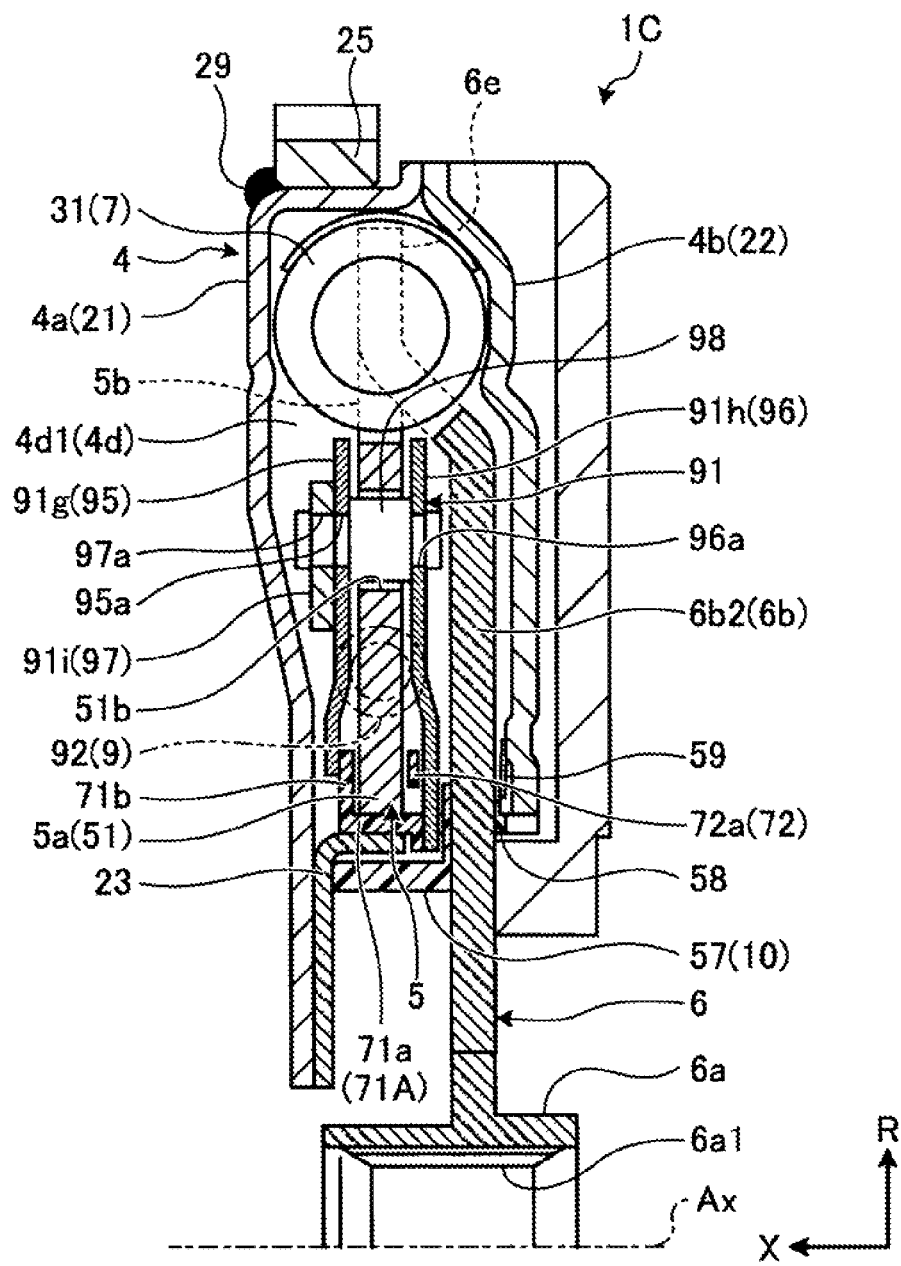
FIG. 6 is a cross-sectional view of a main portion of a damper apparatus according to a fourth embodiment disclosed here.

A damper apparatus 10 illustrated in FIG. 6 according to a fourth embodiment includes a substantially similar construction to the construction of the damper apparatus 1 according to the first embodiment. Thus, the substantially similar effect as the first embodiment based on the substantially similar construction may be obtained in the fourth embodiment. In the following, a different construction of the fourth embodiment from the first embodiment will be mainly explained.

As illustrated in FIG. 6, the dynamic vibration absorber 9 is housed along with the elastic portions 7 and 8 in the housing chamber 4d of the rotation member 4.

In addition, the rotation member 6 includes the cylindrical portion 6a, the wall portion 6b, and the protruding portion 6e serving as a second portion. In the fourth embodiment, the wall portion 6b protrudes radially outwardly from the cylindrical portion 6a to be positioned within the housing chamber 4d. The wall portion 6b is formed annularly around the rotation axis Ax. The protruding portion 6e is connected to an outer edge portion of the wall portion 6b. The wall portion 6b includes a portion 6b2 serving as a first portion positioned to face the dynamic vibration absorber 9 in the axial direction (in the direction X). The protruding portion 6e is positioned at the radially outer side relative to the dynamic vibration absorber 9. The dynamic vibration absorber 9 is positioned between the portion 6b2 of the wall portion 6b and the wall portion 4a. A clearance is formed between the dynamic vibration absorber 9 and the wall portion 6b while a clearance is formed between the dynamic vibration absorber 9 and the wall portion 4a.

Further, in the fourth embodiment, the anchor member 91 and the elastic portion 92 of the dynamic vibration absorber 9 are positioned at the radially inner side of the elastic portions 7 and 8. The anchor member 91 includes a pair of wall portions 91g, 91h, and an anchor portion 91i. The wall portions 91g, 91h and the anchor portion 91i are formed annularly around the rotation axis Ax. The wall portion 91h is positioned at the second side (the right side in FIG. 6) in the axial direction relative to the wall portion 91g. The anchor portion 91i is positioned at the first side (the left side in FIG. 6) in the axial direction relative to the wall portion 91g. The wall portions 91g, 91h and the anchor portion 91i may be made of metallic material, for example. The anchor member 91 includes plates 95, 96 and 97 constituting the wall portions 91g, 91h and the anchor portion 91i respectively. The plates 95, 96 and 97 include plural opening portions 95a, 96a and 97a respectively. The opening portions 95a, 96a and 97a overlap the opening portions 51b of the rotation member 5 in the axial direction. In the fourth embodiment, for example, the opening portion 51b may be formed by an elongated bore extending in the circumferential direction. A fastening member 98 such as a rivet, for example, for fastening and connecting the plates 95 to 97 is inserted to be positioned within each of the opening portions 51b (the elongated bore) in a state to be movable and slidable in the circumferential direction. The anchor member 91 integrally rotates with the rotation member 5 in a state where the fastening member 98 engages with an edge portion of the opening portion 51b by the relative rotation or movement between the anchor member 91 and the rotation member 5. That is, because of the edge portion of the opening portion 51b and the fastening member 98, a relative rotation angle (i.e., a rotation amount) between the anchor member 91 and the rotation member 5 is specified.

In the fourth embodiment, the rotation member 5 is rotatably supported at the plate 23 (the rotation member 4) via an intervening member 71A. The rotation member 5 is positioned in the radial direction (i.e., centered) by the intervening member 71A. The intervening member 71A is arranged between and across the wall portions 91g and 91h. Accordingly, the wall portions 91g and 91h are restrained from moving (falling) to come closer to each other in the axial direction. Further, the movement (falling) of the rotation member 5 in the axial direction may be restrained by the wall portion 71b positioned between the wall portions 91g and 5a and by the wall portion 72a positioned between the wall portions 91h and 5a.

In addition, in the fourth embodiment, the hysteresis portion 10 is provided between the rotation members 4 and 6 without an intervention of the rotation member 5. The thrust member 57 is arranged between the wall portion 4a (the plate 23) and the wall portion 6b. The thrust member 57 is positioned at the radially inner side of the intervening member 71A. The thrust member 58 is arranged between the wall portion 4b and the wall portion 6b. The elastic member 59 is disposed between the wall portion 4b and the thrust member 58 to bias the thrust member 58 towards the wall portion 6b (i.e., towards the thrust member 57).

Further, in the fourth embodiment, the housing chamber 4d is closed or sealed by the plate 23, the intervening member 71A, the thrust members 57 and 58. That is, the plate 23, the intervening member 71A, the thrust members 57 and 58 constitute seal portions.

According to the fourth embodiment, the anchor member 91 and the elastic portion 92 (the third elastic portion) of the dynamic vibration absorber 9 are positioned at the radially inner side of the elastic portion 7 (the first elastic portion) and the elastic portion 8 (the second elastic portion). Thus, as compared to a construction where the anchor member 91 is arranged to face the elastic portions 7 and 8 in the axial direction (in the direction X), for example, the damper apparatus 10 may be further reduced in size in the axial direction.

In addition, in the fourth embodiment, the rotation member 4 includes the housing chamber 4d in which the elastic portions 7, 8 and the dynamic vibration absorber 9 are housed. Thus, as compared to a construction where the elastic portions 7, 8 and the dynamic vibration absorber 9 are housed in different housing chambers from one another, for example, the elastic portions 7, 8 and the dynamic vibration absorber 9 may be arranged in an intensive manner. Thus, a space for arranging the elastic portions 7, 8 and the dynamic vibration absorber 9 may be reduced, for example.

Further, in the fourth embodiment, the rotation member 6 includes the portion 6b2 (the first portion) arranged to face the dynamic vibration absorber 9 in the axial direction and the protruding portion 6e (the second portion) connected to the portion 6b2 and positioned at the radially outer side of the dynamic vibration absorber 9. Thus, because a space at the radially outer side of the dynamic vibration absorber 9 (i.e., at the outer side of the dynamic vibration absorber 9 in the radial direction) is utilized for arranging the protruding portion 6e, the damper apparatus 1C may be downsized.

Figure 7:
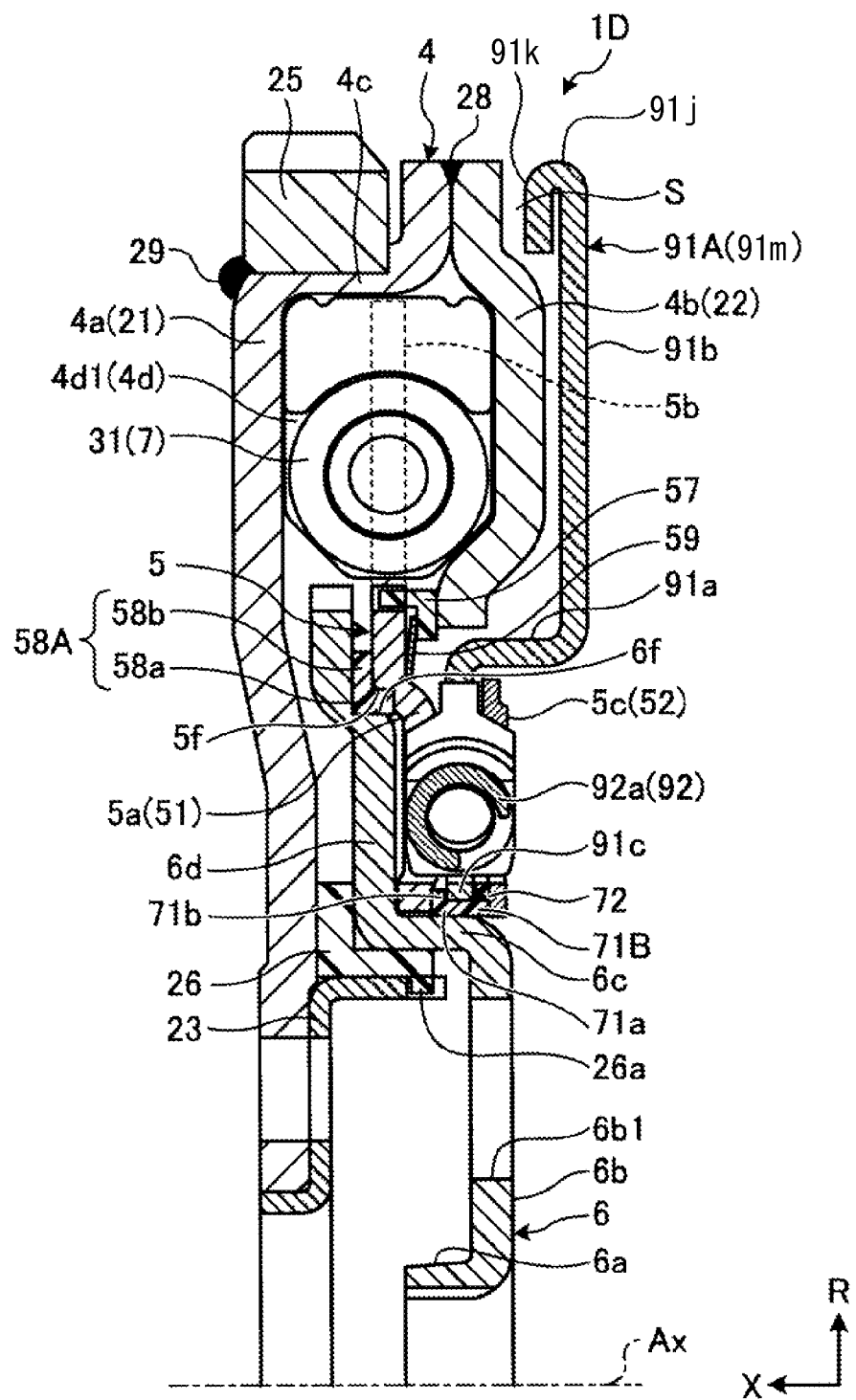
FIG. 7 is a cross-sectional view of a main portion of a damper apparatus according to a fifth embodiment disclosed here.

A damper apparatus 1D illustrated in FIG. 7 according to a fifth embodiment includes a substantially similar construction to the construction of the damper apparatus 1 according to the first embodiment. Thus, the substantially similar effect as the first embodiment based on the substantially similar construction may be obtained in the fifth embodiment. In the following, a different construction of the fifth embodiment from the first embodiment will be mainly explained.

In the fifth embodiment, as illustrated in FIG. 7, a bending potion 91k is formed at an end portion 91j serving as an outer edge, an outer edge portion, or an outer peripheral portion. Specifically, the bending portion 91k is bent (folded-back) from the end portion 91j of the wall portion 91b towards the rotation axis Ax. In addition, the bending portion 91k is positioned at a void portion S formed between the wall portion 91b of an anchor member 91A (spindle member or weight member) and the wall portion 4b of the rotation member 4. The void portion S is a recess portion (a dead space) formed upon pressing of the outer edge of the wall portion 4a (the plate 21) and the outer edge of the wall portion 4b (the plate 22). In the fifth embodiment, the cylindrical portion 91a, the wall portions 91b, 91c and the bending portion 91k constitute a base portion 91m of the anchor member 91A.

A thrust member 58A is provided between the rotation members 5 and 6. The thrust member 58A is disposed between a stepped portion 5f of the wall portion 5a and a stepped portion 6f of the wall portion 6d. The stepped portions 5f and 6f face to be spaced away from each other in the radial direction. The thrust member 58A includes a cylindrical portion 58a and a wall portion 58b. The cylindrical portion 58a is formed in a cylindrical form with reference to the rotation axis Ax and is sandwiched and held between the stepped portions 5f and 6f from the opposed sides in the radial direction. The wall portion 58b is formed in an annular and plate form expanding and protruding radially outwardly from an end portion of the cylindrical portion 58a at the first side (the left side in FIG. 7) in the axial direction. The wall portion 58b is sandwiched and held between the wall portions 5a and 6d from the opposed sides in the axial direction. In the fifth embodiment, the rotation member 5 is supported and positioned in the axial direction and the radial direction (i.e., centered) by the thrust member 58A having an L-shaped cross section. The thrust member 58A is an example of the second intervening member.

An intervening member 71B is disposed between the rotation member 6 and the anchor member 91A. The intervening member 71B includes the cylindrical portion 71a and the wall portion 71b in the same way as the first embodiment. The cylindrical portion 71a is positioned between the wall portion 6c and the wall portion 91c to be sandwiched and held therebetween from the opposed sides in the radial direction. The wall portion 71b protrudes radially outwardly from an end portion of the cylindrical portion 71a at the first side (the left side in FIG. 7) in the axial direction. The wall portion 71b is positioned between the wall portion 5a and the wall portion 91c to be sandwiched and held therebetween from the opposed sides in the axial direction. In the fifth embodiment, the intervening member 71B is inhibited from being positioned at the inner edge portion (radially inner edge portion) of the rotation member 5. The inner edge portion of the rotation member 5 faces the wall portion 6c of the rotation member 6. In the same way as the first embodiment, the intervening member 72 is provided between the wall portion 5c and the wall portion 91c. In the fifth embodiment, the anchor member 91A is supported and positioned in the axial direction and the radial direction (i.e., the anchor member 91A is centered) by the intervening member 71B. The intervening member 71B is an example of a third intervening member.

Accordingly to the fifth embodiment, the anchor member 91A includes the base portion 91m in a plate form extending radially outwardly. The bending portion 91k is formed at the end portion 91j (outer edge) formed at the radially outer side of the base portion 91m. Thus, by the bending portion 91k, a moment of inertia of the anchor member 91A may increase, for example. In addition, because the bending portion 91k is positioned in the void portion S serving as the recess portion and the dead space formed between the wall portion 91b and the wall portion 4b, the damper apparatus 1D may be formed to be downsized (i.e., to be thinner) in the axial direction.

Further, in the fifth embodiment, the thrust member 26 (first intervening member) is disposed between the rotation members 4 and 6 to support the rotation member 6 in the radial direction, and the thrust member 58A is disposed between the rotation members 5 and 6 to support the rotation member 5 in the radial direction. In addition, the intervening member 71B (the third intervening member) is disposed between the rotation member 6 and the anchor member 91A to support the anchor member 91A in the radial direction. Thus, the movements of the rotation members 5, 6, and the anchor member 91A in the radial direction may be restrained. A space for the elastic member 92a in the radial direction may be secured so that the elastic member 92a may be formed by a coil spring elongated in the radial direction. Consequently, the performance of the dynamic vibration absorber 9 (i.e., restraining a torsional vibration) may improve.

Figure 8:
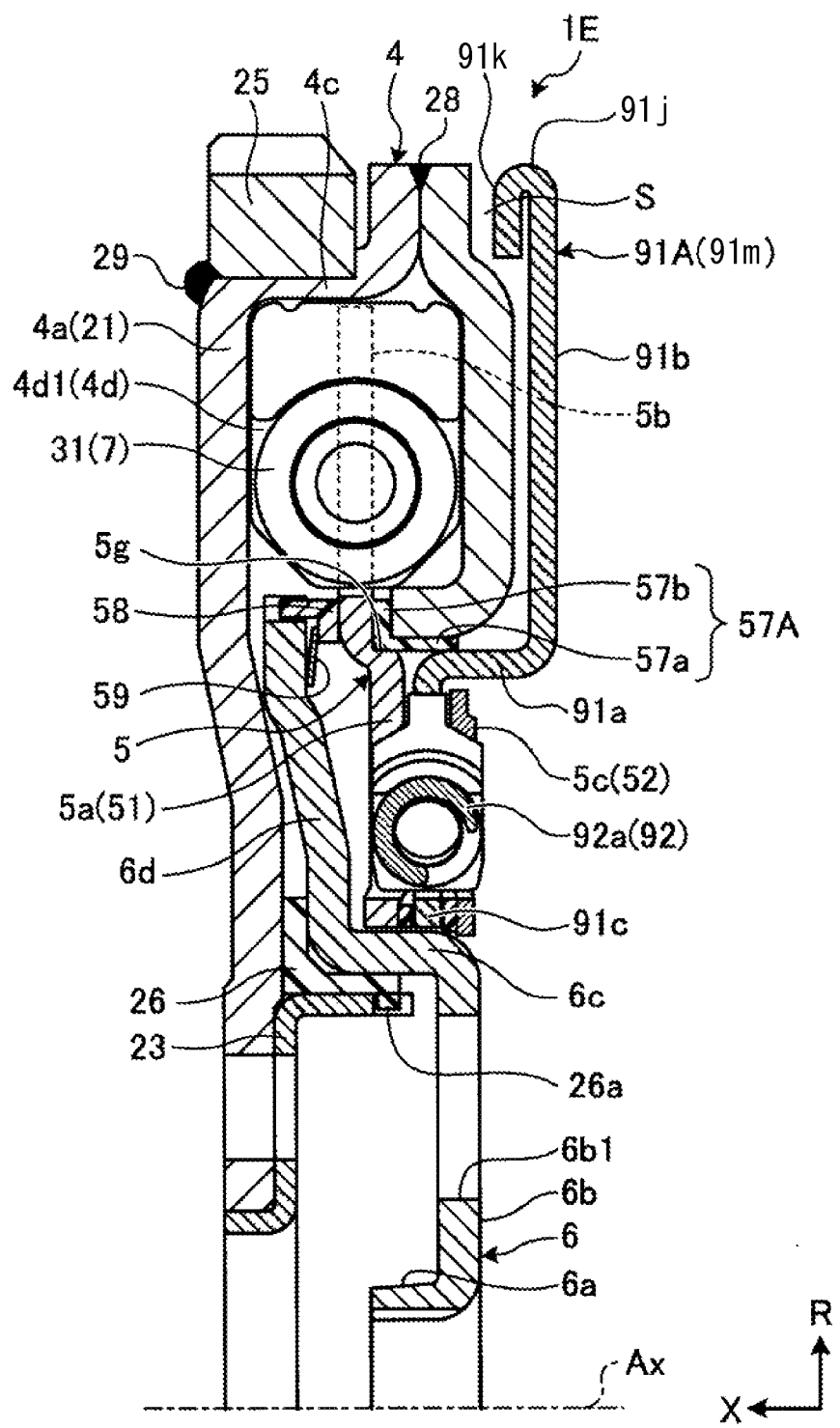
FIG. 8 is a cross-sectional view of a main portion of a damper apparatus according to a sixth embodiment disclosed here.

A damper apparatus 1E illustrated in FIG. 8 according to a sixth embodiment includes a substantially similar construction to the construction of the damper apparatus 1 according to the first embodiment. Thus, the substantially similar effect as the first embodiment based on the substantially similar construction may be obtained in the sixth embodiment. In the following, a different construction of the sixth embodiment from the first embodiment will be mainly explained.

In the sixth embodiment, as illustrated in FIG. 8, a thrust member 57A is disposed among the rotation members 4, 5 and the anchor member 91A. The thrust member 57A includes a cylinder portion 57a formed in a cylindrical form and a wall portion 57b formed in an annular and plate form protruding radially outwardly from the cylinder portion 57a. The wall portion 57b is positioned between the wall portion 4b and the wall portion 5a to be sandwiched and held therebetween from the opposed sides in the axial direction. The cylinder portion 57a is formed between and across a stepped portion 5g of the wall portion 5a and the cylinder portion 91a. The cylinder portion 57a is sandwiched and held among the wall portion 4b, the stepped portion 5g and the cylinder portion 91a from the opposed sides in the radial direction. In the sixth embodiment, the rotation member 5 and the cylinder portion 91a are supported and positioned in the radial direction, i.e., centered, by the thrust member 57A including the aforementioned configuration. The cylinder portion 57a faces the stepped portion 5g and the cylinder portion 91a at the radially outer side thereof. An inner edge portion of the wall portion 5a of the rotation member 5 and an inner edge portion of the wall portion 91c of the anchor member 91A face the wall portion 6c of the rotation member 6. In the sixth embodiment, the thrust member 57A is an example of the second intervening member.

Accordingly, in the sixth embodiment, the thrust member 26 (first intervening member) is disposed between the rotation members 4 and 6 so as to support the rotation member 6 in the radial direction. In addition, the thrust member 57A (second intervening member) is disposed among the rotation members 4, 5 and the anchor member 91A so as to support the rotation member 5 and the anchor member 91A in the radial direction. Thus, the movements of the rotation members 5, 6 and the anchor member 91A in the radial direction, for example, may be restrained.

Figure 9:
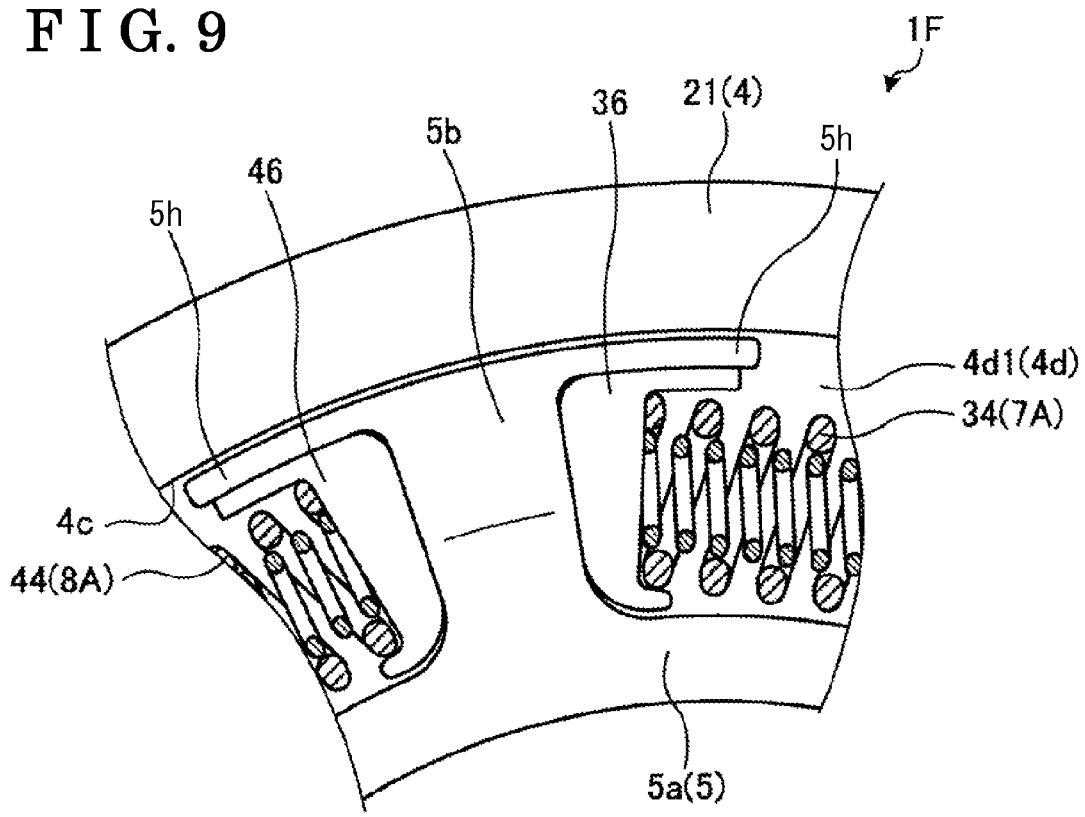
FIG. 9 is a front view of a portion of a damper apparatus according to a seventh embodiment when viewed from the axial direction.

A damper apparatus 1F illustrated in FIG. 9 according to a seventh embodiment includes a substantially similar construction to the construction of the damper apparatus 1A according to the second embodiment. Thus, the substantially similar effect as the second embodiment based on the substantially similar construction may be obtained in the seventh embodiment. In the following, a different construction of the seventh embodiment from the second embodiment will be mainly explained.

In the seventh embodiment, as illustrated in FIG. 9, two protrusions 5h are formed at a radially outer end side of the protruding portion 5b of the rotation member 5. Specifically, the two protrusions 5h are formed at opposed end portions of the protruding portion 5b in the circumferential direction. The two protrusions 5h protrude in opposite directions from each other along the circumferential direction from the opposed end portions of the protruding portion 5b in the circumferential direction. The protrusions 5h are positioned among the connection portion 4c of the rotation member 4 and the support members 36 and 46. The support members 36 and 46 are supported by the protruding portions 5b and the protrusions 5h.

Figure 10:
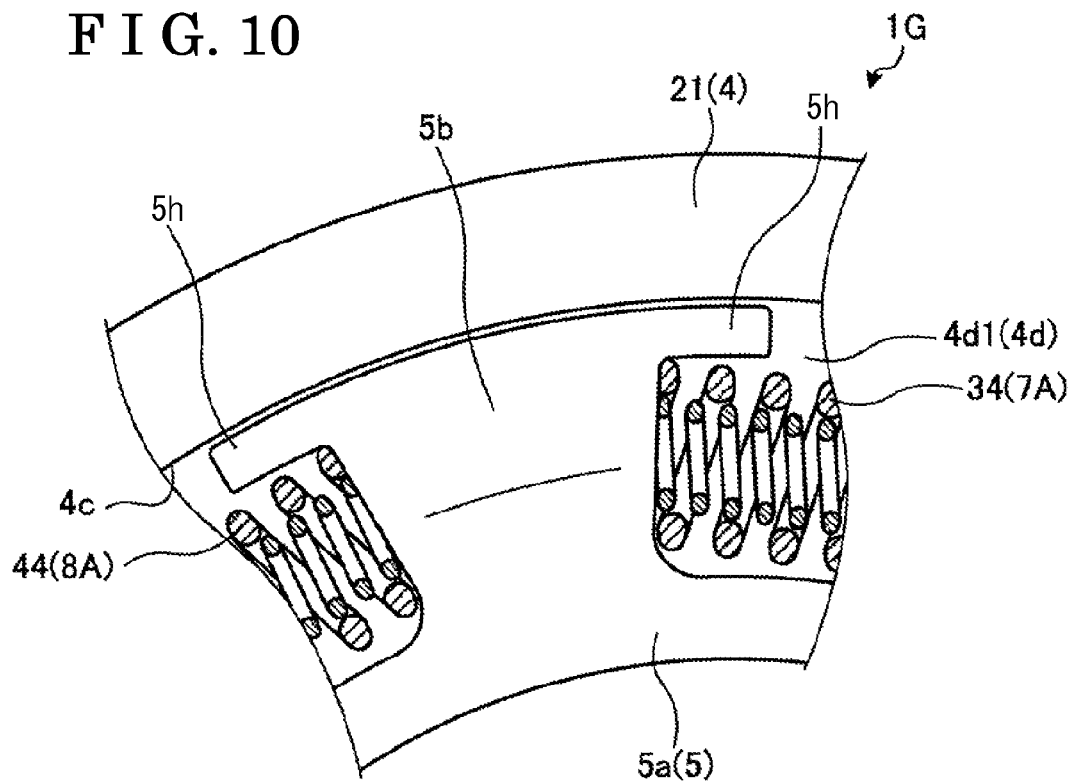
FIG. 10 is a front view of a portion of a damper apparatus according to an eighth embodiment when viewed from the axial direction.

A damper apparatus 1G illustrated in FIG. 10 according to an eighth embodiment includes a substantially similar construction to the construction of the damper apparatus 1A according to the second embodiment. Thus, the substantially similar effect as the second embodiment based on the substantially similar construction may be obtained in the eighth embodiment. In the following, a different construction of the eighth embodiment from the second embodiment will be mainly explained.

In the eighth embodiment, as illustrated in FIG. 10, the two protrusions 5h are formed at the radially outer end side of the protruding portion 5b of the rotation member 5. Specifically, the two protrusions 5h are formed at opposed end portions of the protruding portion 5b in the circumferential direction. In the same way as the seventh embodiment, the two protrusions 5h protrude in opposite directions from each other along the circumferential direction from the opposed end portions of the protruding portion 5b in the circumferential direction. In the eighth embodiment, the support members 36 and 46 (see FIG. 2) are not provided. That is, the elastic members 34 and 44 are in contact with the protruding portions 5b respectively. Each of the protrusions 5h is positioned between the connection portion 4c of the rotation member 4 and either the elastic member 34 or 44.

Figure 11:
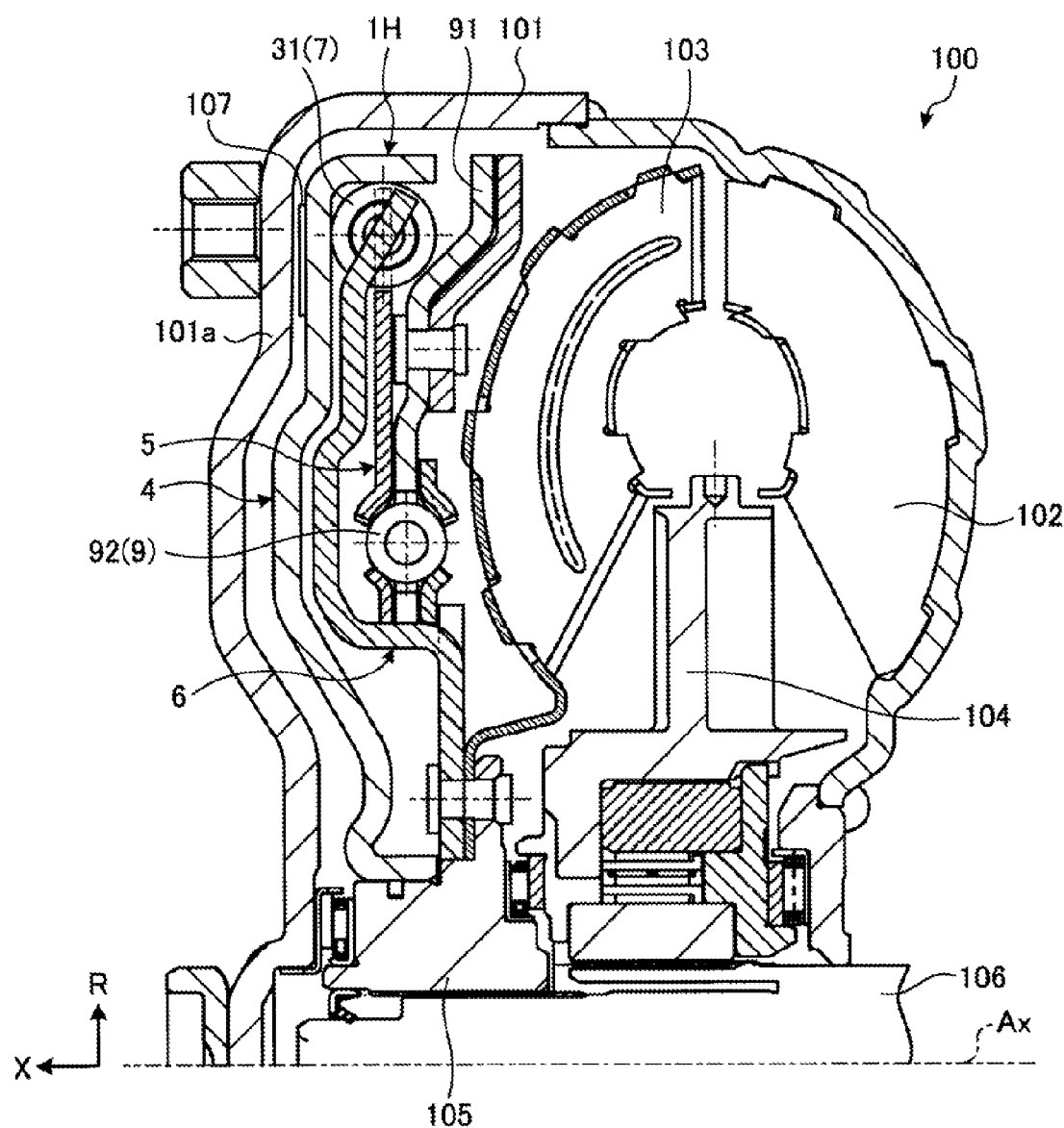
FIG. 11 is a cross-sectional view of a damper apparatus according to a ninth embodiment disclosed here.

A damper apparatus 1H illustrated in FIG. 11 according to a ninth embodiment includes a substantially similar construction to the construction of the damper apparatus 1 according to the first embodiment. Thus, the substantially similar effect as the first embodiment based on the substantially similar construction may be obtained in the ninth embodiment. In the following, a different construction of the ninth embodiment from the first embodiment will be mainly explained.

As illustrated in FIG. 11, the damper apparatus 1H serving as a lock-up damper according to the ninth embodiment is mounted to a torque converter 100.

The torque converter 100 includes a housing 101 that is rotatable about the rotation axis Ax. The housing 101 houses therein a pump impeller 102, a turbine runner 103, a stator 104, and the damper apparatus 1H. In addition, a working fluid (oil) is housed at an inside of the housing 101. That is, in the ninth embodiment, the damper 1H is immersed in the working fluid. The pump impeller 102 is connected or secured to the housing 101 so as to integrally rotate therewith. The turbine runner 103 is connected or secured to a shaft 106 via a turbine hub 105 to integrally rotate with the shaft 106. Torque (rotation) of the shaft 106 is transmitted to a transmission. The stator 104 is disposed between the pump impeller 102 and the turbine runner 103.

In the torque converter 100, torque from a power source is transmitted to the housing 101 which is then integrally rotate with the pump impeller 102. Torque of the pump impeller 102 is transmitted to the turbine runner 103 via the working fluid so that the turbine runner 103 rotates. Because of the rotation of the turbine runner 103, the turbine hub 105 and the shaft 106 integrally rotate with the turbine runner 103.

In the same way as the damper apparatuses 1, 1A, 1B, 1C, 1D, 1E, 1F and 1G in the first to eighth embodiment, the damper apparatus 1H includes the rotation members 4 to 6, the elastic portions 7, 8 (in FIG. 11, the elastic member 8 is omitted), the dynamic vibration absorber 9, and the like.

The rotation member 4 serving as a lock-up piston faces a wall portion 101a of the housing 101 formed at the first side (the left side in FIG. 11) in the axial direction. A friction member 107 is provided at a surface of the rotation member 4 facing the wall portion 101a. The rotation member 4 is provided to be movable in the axial direction between a position at which the friction member 107 is away from the wall portion 101a and a position at which the friction member 107 is in contact with the wall portion 101a. The rotation member 6 is connected or secured to the turbine runner 103 and the turbine hub 105 to integrally rotate therewith.

In a case where the torque is not transmitted from the power source to the housing 101, the friction member 107 is away from the wall portion 101a. In a case where the torque is transmitted from the power source to the housing 101, the pump impeller 102 starts rotating. When a rotation speed of the pump impeller 102 increases, the turbine runner 103 starts rotating. At this time, the torque is transmitted from the pump impeller 102 to the turbine runner 103 via the working fluid, which generates a torque transmission loss. Thus, in a state where the friction member 107 is away from the wall portion 101a, a rotation speed of the turbine runner 103 is smaller than the pump impeller 102.

In a case where the rotation speed of the turbine runner 103 exceeds a specified rotation speed, the working fluid between the rotation member 4 and the wall portion 101a is discharged so that a pressure of working fluid at one side of the rotation member 4 facing the wall portion 101a and a pressure of working fluid at the other side of the rotation member 4 opposite from the wall portion 101a, i.e., facing the turbine runner 103, are differentiated, resulting in a pressure difference. Because of the foregoing pressure difference, the rotation member 4 moves towards the wall portion 101a to press the friction member 107 against the wall portion 101a. The torque of the housing 101 is transmitted to the rotation member 4 accordingly. The rotation member 4 then integrally rotates with the housing 101 so that the torque of the housing 101 is directly transmitted to the turbine runner 103 via the damper apparatus 1H. As a result, the torque of a driving source is transmitted to the turbine runner 103 with a high efficiency. In a case where the friction member 107 is pressed against the wall portion 101a, a torque fluctuation (an impact torque) generated by a speed difference between the housing 101 and the turbine runner 103 is absorbed by the elastic portions 7 and 8 of the damper apparatus 1H.

In the second embodiment, at least one of the elastic portions 7A and 8A includes the plural elastic members 34 or 44 connected in series in the circumferential direction of the rotation axis Ax.

In addition, in the fourth embodiment, the anchor member 91 is positioned at the inner side of the elastic portions 7 and 8 in the radial direction.

Further, in the fourth embodiment, one of the rotation members 4 and 6 includes the housing chamber 4d that houses the elastic portions 7 and 8, and the dynamic vibration absorber 9.

Furthermore, in the fourth embodiment, the rotation member 6 includes the portion 6b2 disposed to face the dynamic vibration absorber 9 in the axial direction of the rotation axis Ax and the protruding portion 6e connected to the portion 6b2 to be positioned at the outer side of the dynamic vibration absorber 9 in the radial direction.

Furthermore, in the fifth embodiment, the anchor portion 91A includes the base portion 91m extending to the outer side in the radial direction to form a plate form, and the bending portion 91k is formed at the outer edge of the base portion 91m.

Furthermore, in the first and second embodiments, the damper apparatus 1, 1A further includes the thrust member 26 (first intervening member) interposed between the rotation members 4 and 6 to support the rotation member 6 in the radial direction and the intervening member 71 (second intervening member) interposed among the rotation members 5, 6, and the anchor member 91 to support the rotation member 5 and the anchor member 91 in the radial direction.

Furthermore, in the fifth embodiment, the damper apparatus 1D further includes the thrust member 26 (first intervening member) interposed between the rotation members 4 and 6 to support the rotation member 6 in the radial direction, the thrust member 58A (second intervening member) interposed between the rotation members 5 and 6 to support the rotation member 5 in the radial direction, and the intervening member 71B (third intervening member) interposed between the rotation member 6 and the anchor member 91A to support the anchor member 91A in the radial direction.

Furthermore, in the sixth embodiment, the damper apparatus 1E further includes the thrust member 26 (first intervening member) interposed between the rotation members 4 and 6 to support the rotation member 6 in the radial direction and the thrust member 57A (second intervening member) interposed among the rotation members 4, 5 and the anchor member 91A to support the rotation member 5 and the anchor member 91A in the radial direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A damper apparatus comprising:
   a first rotation member being rotatable around a rotation axis;
   a second rotation member being rotatable around the rotation axis;
   a first elastic portion interposed between the first rotation member and the second rotation member and being elastically deformed by a relative rotation between the first rotation member and the second rotation member;
   a third rotation member being rotatable around the rotation axis;
   a second elastic portion interposed between the second rotation member and the third rotation member and being elastically deformed by a relative rotation between the second rotation member and the third rotation member, the first and second elastic portions being connected in series in a circumferential direction of the rotation axis; and
   a dynamic vibration absorber including an anchor member and a third elastic portion that is interposed between the anchor member and the second rotation member and that is elastically deformed by a relative rotation between the anchor member and the second rotation member, at least the third elastic portion being positioned at an inner side of the first elastic portion and the second elastic portion in a radial direction of the rotation axis.

2. The damper apparatus according to claim 1, wherein at least one of the first elastic portion and the second elastic portion includes a plurality of elastic members connected in series in a circumferential direction of the rotation axis.

3. The damper apparatus according to claim 1, wherein the anchor member is positioned at the inner side of the first elastic portion and the second elastic portion in the radial direction.

4. The damper apparatus according to claim 1, wherein one of the first rotation member and the third rotation member includes a housing chamber that houses the first elastic portion, the second elastic portion, and the dynamic vibration absorber.

5. The damper apparatus according to claim 1, wherein the third rotation member includes a first portion disposed to face the dynamic vibration absorber in an axial direction of the rotation axis and a second portion connected to the first portion to be positioned at an outer side of the dynamic vibration absorber in the radial direction.

6. The damper apparatus according to claim 1, wherein the anchor portion includes a base portion extending to an outer side in the radial direction to form a plate form, and a bending portion is formed at an outer edge of the base portion.

7. The damper apparatus according to claim 1, further comprising:
a first intervening member interposed between the first rotation member and the third rotation member to support the third rotation member in the radial direction;
a second intervening member interposed between the second rotation member and the third rotation member to support the second rotation member in the radial direction; and
a third intervening member interposed between the third rotation member and the anchor member to support the anchor member in the radial direction.

8. The damper apparatus according to claim 1, further comprising:
a first intervening member interposed between the first rotation member and the third rotation member to support the third rotation member in the radial direction; and
a second intervening member interposed among the first rotation member, the second rotation member and the anchor member to support the second rotation member and the anchor member in the radial direction.

9. The damper apparatus according to claim 1, wherein the anchor member includes a cylindrical portion and a wall portion, the cylindrical portion being formed between the first elastic portion and the third elastic portion in cylindrical form around the rotation axis, and the wall portion being formed at an end of the cylindrical portion in the radial direction.

10. A damper apparatus comprising:
a first rotation member being rotatable around a rotation axis;
a second rotation member being rotatable around the rotation axis;
a first elastic portion interposed between the first rotation member and the second rotation member and being elastically deformed by a relative rotation between the first rotation member and the second rotation member;
a third rotation member being rotatable around the rotation axis;
a second elastic portion interposed between the second rotation member and the third rotation member and being elastically deformed by a relative rotation between the second rotation member and the third rotation member;
a dynamic vibration absorber including an anchor member and a third elastic portion that is interposed between the anchor member and the second rotation member and that is elastically deformed by a relative rotation between the anchor member and the second rotation member, at least the third elastic portion being positioned at an inner side of the first elastic portion and the second elastic portion in a radial direction of the rotation axis;
a first intervening member interposed between the first rotation member and the third rotation member to support the third rotation member in the radial direction; and
a second intervening member interposed among the third rotation member, the second rotation member, and the anchor member to support the second rotation member and the anchor member in the radial direction.

11. The damper apparatus according to claim 10, wherein the anchor member includes a cylindrical portion and a wall portion, the cylindrical portion being formed between the first elastic portion and the third elastic portion in cylindrical form around the rotation axis, and the wall portion being formed at an end of the cylindrical portion in the radial direction.

* * * * *